United States Patent
Chau et al.

(10) Patent No.: US 12,097,624 B2
(45) Date of Patent: Sep. 24, 2024

(54) SYSTEMS AND METHODS FOR PIPETTE ROBOT TIME-OF-FLIGHT FUNCTIONALITY

(71) Applicant: Opentrons LabWorks Inc., Brooklyn, NY (US)

(72) Inventors: Chiu Chau, Edison, NJ (US); Jane Shmushkis, Manalapan, NJ (US)

(73) Assignee: Opentrons Labworks Inc., Brooklyn, NY (US)

( * ) Notice: Subject to any disclaimer, the term of this patent is extended or adjusted under 35 U.S.C. 154(b) by 647 days.

(21) Appl. No.: 16/779,204

(22) Filed: Jan. 31, 2020

(65) Prior Publication Data

US 2020/0246976 A1 Aug. 6, 2020

Related U.S. Application Data

(60) Provisional application No. 62/800,269, filed on Feb. 1, 2019.

(51) Int. Cl.
| | | |
|---|---|---|
| *B25J 9/16* | (2006.01) | |
| *B25J 13/08* | (2006.01) | |
| *G01N 35/04* | (2006.01) | |

(52) U.S. Cl.
CPC ............ *B25J 9/1694* (2013.01); *B25J 9/161* (2013.01); *B25J 9/163* (2013.01); *B25J 9/1679* (2013.01); *B25J 13/08* (2013.01); *G01N 2035/0474* (2013.01)

(58) Field of Classification Search
CPC . B25J 9/1694; B25J 9/161; B25J 9/163; B25J 9/1679; B25J 13/08; B25J 19/021; G01N 2035/0474; G01N 2035/1013; G01N 2035/1025; G01N 35/1011; G01N 35/0099; B01L 2200/025; G01S 7/4865
See application file for complete search history.

(56) References Cited

U.S. PATENT DOCUMENTS

| | | | | |
|---|---|---|---|---|
| 5,465,629 A | * | 11/1995 | Waylett, Jr. | ......... G01F 23/2967 73/864.24 |
| 9,513,152 B1 | * | 12/2016 | Holcomb | ............. G01D 5/2415 |
| 2005/0124059 A1 | * | 6/2005 | Kureshy | ............ G01N 35/1016 435/287.2 |
| 2009/0133511 A1 | * | 5/2009 | Heinze | ................ G01F 23/2962 137/565.29 |
| 2010/0077853 A1 | * | 4/2010 | Elsenhans | ............. G01F 23/296 73/290 V |
| 2014/0260696 A1 | * | 9/2014 | Criswell | ................ G01B 11/14 422/511 |
| 2016/0018427 A1 | * | 1/2016 | Streibl | ................ G01F 23/2921 702/19 |

* cited by examiner

*Primary Examiner* — Jill A Warden
*Assistant Examiner* — John McGuirk
(74) *Attorney, Agent, or Firm* — ORRICK, HERRINGTON & SUTCLIFFE LLP

(57) ABSTRACT

Systems and methods applicable, for instance, to pipette robots. A pipette robot can perform one or more tip presence check operations, one or more tip seal check operations, and/or one or more distance sensing operations, including distance sensing operations which regard determining the height of the surface of a liquid.

9 Claims, 20 Drawing Sheets

IR/ 940nm Light diode output and time for light come back

Accuracy : 1mm

Response : ms

Reliability : 99.9%

Detection : has a specific Field of views ; the farther the wider detection area

SYSTEMS AND METHODS FOR PIPETTE ROBOT TIME-OF-FLIGHT FUNCTIONALITY

CROSS-REFERENCE TO RELATED APPLICATIONS

This application claims priority to U.S. Provisional Patent Application Ser. No. 62/800,269, filed on Feb. 1, 2019, the contents of which are incorporated herein by reference in their entirety and for all purposes.

FIELD OF THE INVENTION

The present disclosure generally relates to system and methods which are applicable to pipette robots.

BACKGROUND OF THE INVENTION

A pipette robot can pick up a tip and attach the tip to a pipette. With a tip attached, the pipette robot can aspirate and dispense liquids using the pipette. However, several difficulties can arise during these operations. The pipette robot can fail to properly execute tip pick up, for example, either because it fails to pick up a tip or because, when attempting to pick up a single tip, the pipette robot instead picks up multiple tips. As another example, the pipette robot can accumulate multiple tips where the pipette robot fails to properly eject an old tip, and then subsequently picks up a new tip. Also, even where a tip pick up operation results in only a single tip being mounted to the pipette, such tip can be inappropriately attached to the pipette, for instance dangling loosely from the pipette, or otherwise not being attached with a proper (e.g., tight) seal. Where a multichannel pipette is employed, the pipette robot can fail to properly execute tip pick up because it fails to pick up a tip for each of the channels of the pipette (e.g., where the pipette robot fails to pick up any tips for one or more channels, or where the pipette robot undesirably picks up multiple tips for one or more channels).

As such, a conventional pipette robot can employ various techniques to determine that one and only one tip has been picked up, and that it is attached appropriately. As examples, conventional pipette robots can employ techniques using cameras to check tip attachment and use issues. However, addressing these issues with camera-based solutions is relatively costly (e.g., due to the expense of developing corresponding software). Further, camera-based solutions can be vulnerable to environmental conditions which can negatively affect image quality.

Another difficulty can arise when a tip is placed too deeply into the liquid being pipetted during aspiration. The outside of the tip can become contaminated with liquid, such as blood. To combat this, conventional pipette robots utilize various approaches to detect the heights of the liquids being pipetted. Conventional approaches for detecting liquid height can include pipette tips with capacitive sensing capabilities to detect the liquid or confocal laser-based sensing to detect the top of the liquid. But, like the noted use of cameras, these solutions are relatively costly.

As such, there is call for technologies which are applicable to overcoming the aforementioned deficiencies of conventional pipette robot approaches.

DETAILED DESCRIPTION

Figure 1:
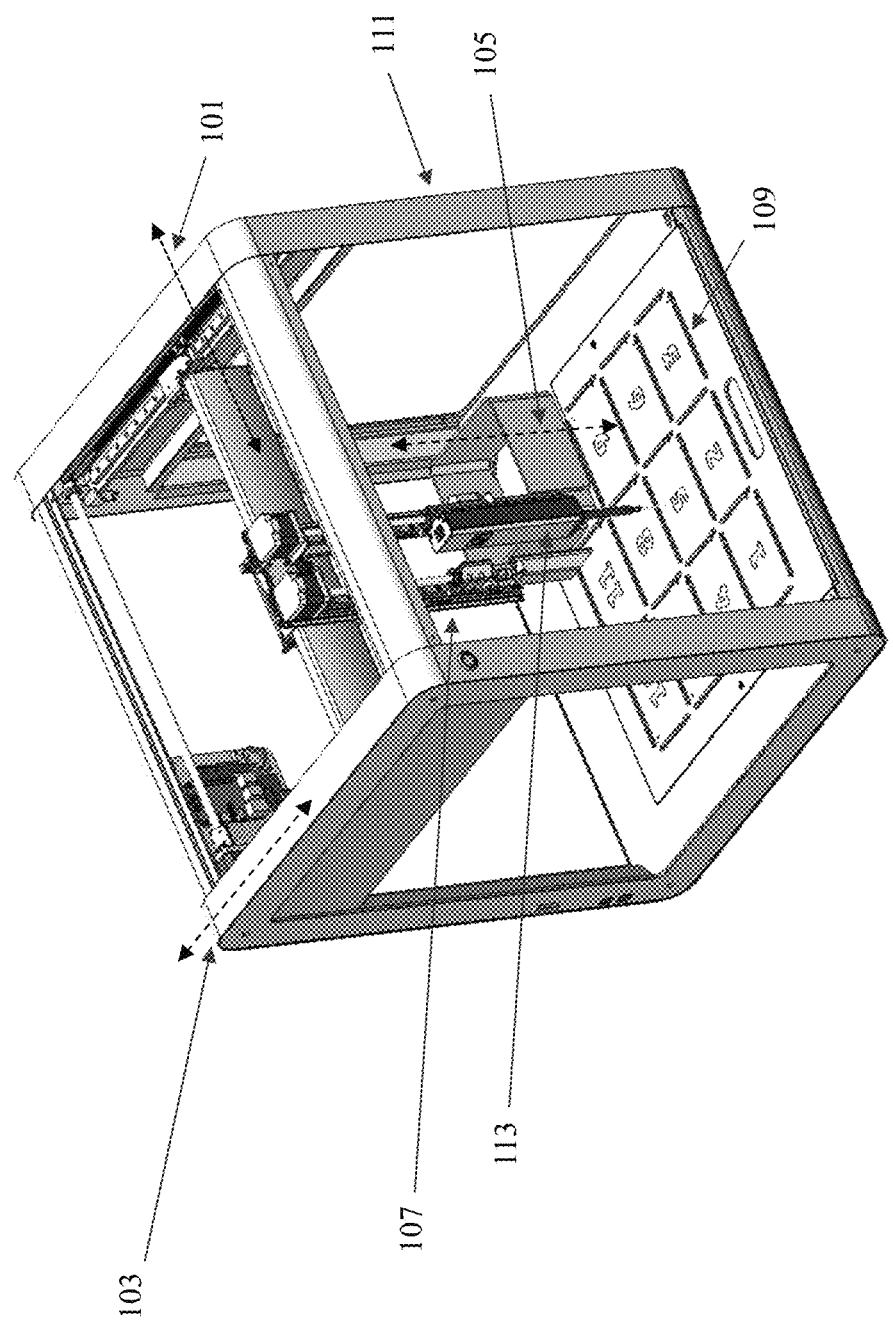
FIG. 1 shows a pipette robot, according to various embodiments.

According to various embodiments, there are provided systems and methods applicable, for instance, to pipette robots. Such systems and methods include ones by which a pipette robot can perform a tip presence check. Such systems and methods also include ones by which a pipette robot can perform a tip seal check. Such systems and methods further include ones by which a pipette robot can perform distance sensing. Shown in FIG. 1 is an example pipette robot according to various embodiments. Shown in FIG. 1 are an X-axis 101, a Y-axis 103, and a Z-axis 105. Further shown in FIG. 1 are a gantry 107, a fixed deck 109, a robot frame 111, and a pipette assembly 113 which is attached to the gantry. It is noted that references to axes made herein follow the arrangement convention shown in FIG. 1. The pipette robot can, according to various embodiments, use motors (e.g., open-loop motors) to move the pipette assembly along the noted X-axis, Y-axis, and Z-axis.

Further, in various embodiments the pipette robot can include one or more time-of-flight (TOF) sensors (e.g., optical and/or sound based TOF sensors). In some embodiments, the one or more TOF sensors can be fixed at various locations within the bay of the pipette robot or in the proximity of the pipette robot. The one or more TOF sensors can be fixed to the pipette robot at such various locations at a time of manufacture and/or assembly of the pipette robot system. In other embodiments, the one or more TOF sensors can be unfixed. In these embodiments, the pipette robot system can use one or more motors (e.g., open-loop motors) to move the one or more sensors to various locations within the bay of the pipette robot system. And, in further embodiments, the TOF sensors can be added to the pipette robot through an accessory package retrofitted to the robot. Various aspects will now be discussed in greater detail.

Tip Presence Check: Single Channel Pipette, Single Fixed Sensor

Figure 2A:
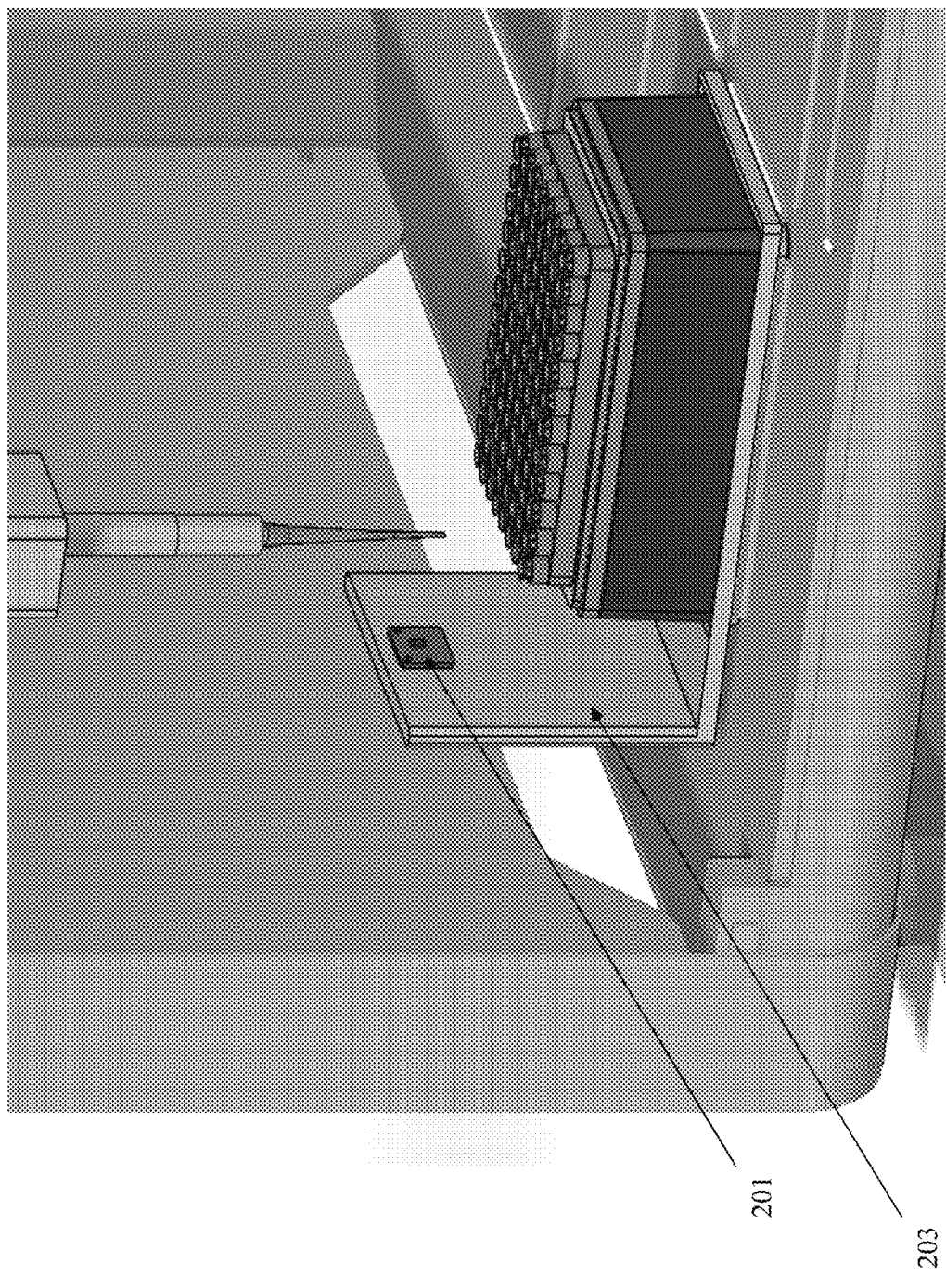
FIG. 2A shows a sensor and a module, according to various embodiments.

According to a first mode of operation, the pipette assembly can employ a single channel pipette (e.g., a robot tool with a single pipette), and the pipette robot can utilize a single, fixed sensor to determine whether or not at least one tip is attached to the single channel pipette. In this illustrative embodiment, the pipette tips can be located adjacent to, and in view of, the fixed sensor. The single, fixed sensor can, as just one example, be located on the frame of the pipette robot. As another example, the single fixed sensor can be situated on a removable module. Shown in FIG. 2A are single fixed sensor 201 and removable module 203. The removable module can, as depicted in FIG. 2A, be placed upon the deck of the pipette robot when tip presence check operations are desired. When tip presence check operations are not desired, the module can be removed from the deck. The module can, as also depicted in FIG. 2A, include a vertical member and a horizontal member. As shown in FIG. 2A, the single fixed sensor can be situated on the vertical member, and a tip holder can be situated on the horizontal member.

Figure 2B:
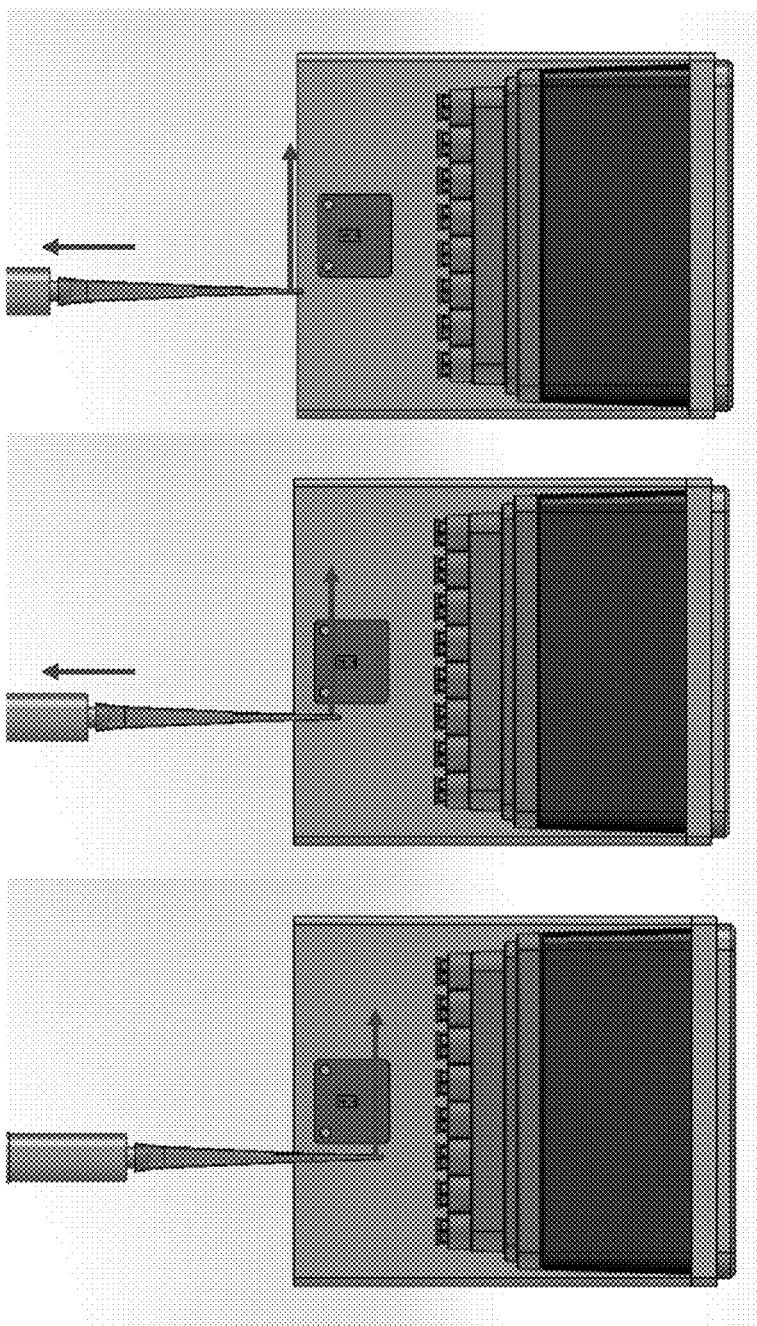
FIG. 2B shows a raising of a pipette assembly, according to various embodiments.

After executing a process for tip pick up, the pipette robot can move the pipette assembly to a test location within the bay. This is accomplished, for example, by identifying the test location in terms of X, Y, and Z coordinates relative to the X, Y, and Z axes of the pipette robot. In selecting the test location to which to travel the pipette assembly, the following can be considered: a) the specific type of tip being employed (e.g., the dimensions thereof); b) the location of the single, fixed sensor; and c) the field of vision (FOV) of the single, fixed sensor. In particular, the test location, location of the fixed sensor, and location of the pipette assembly can be advantageously selected such that when the pipette assembly is at the test location: a) the pipette assembly (e.g., the lowermost portion thereof) will not be within the FOV of the sensor when there is no pipette attached; b) the pipette tips are not within the FOV of the sensor prior to attachment on the pipette assembly; and c) some or all of the pipette tip (e.g., a lower portion of a bottommost tip when several are attached) is within the FOV of the sensor when it is attached to the pipette assembly. In various embodiments, testing can be utilized in selection of the test location. In particular, a single tip can be confirmed to be properly attached to the pipette assembly. Next, the pipette assembly can, relative to the X and Y axes, be aligned with the single sensor. Then, various Z-axis positions of the pipette assembly can be tried to determine whether the sensor can detect the tip at those positions. Those positions at which the sensor can detect the tip can be considered to be valid test locations. As an illustration, as depicted by the three frames (205, 207, 209) of FIG. 2B, the pipette assembly can initially be traveled to a low Z-axis position, such as a position where the tip is touching or nearly touching the deck. Subsequently, the pipette assembly can be raised. See frames 205-209. During the raising, the various Z-axis positions can be tried.

Figure 3A:
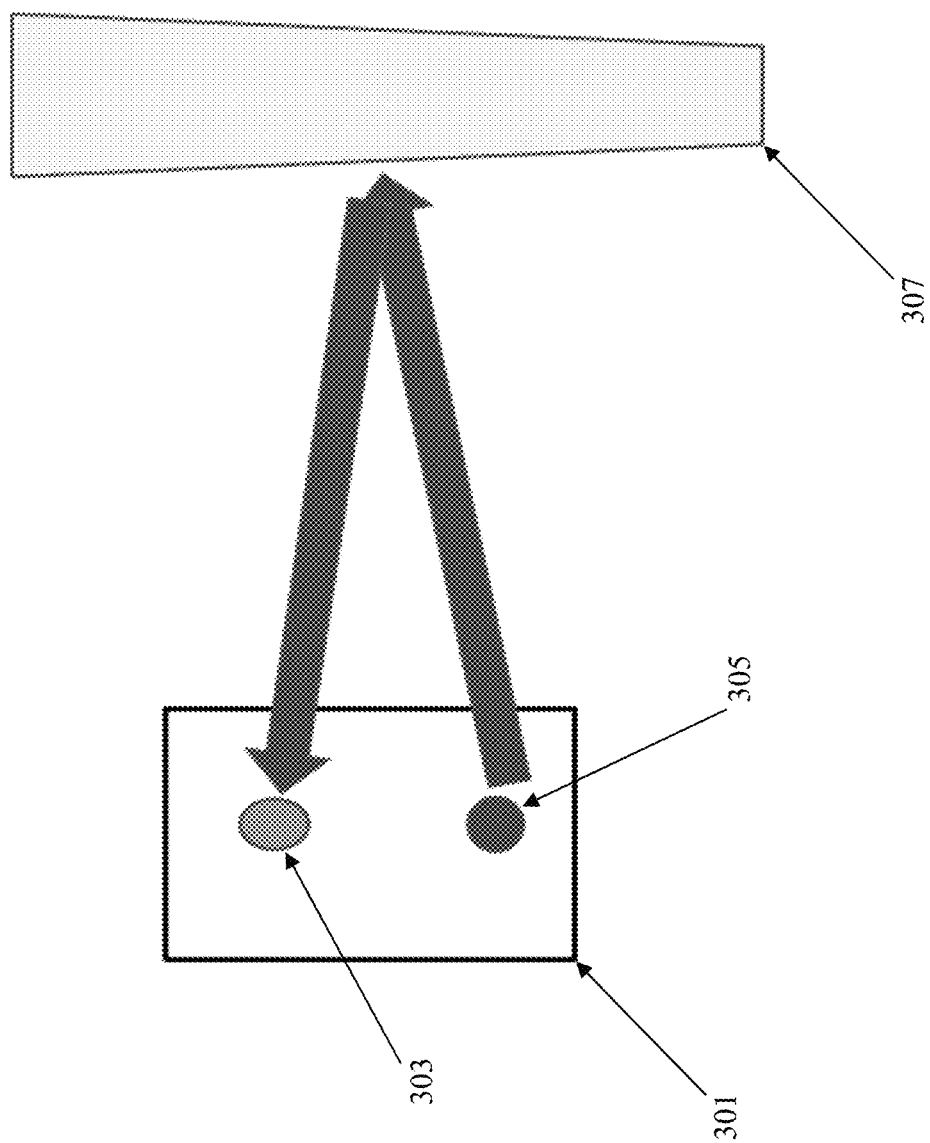
FIG. 3A shows a view of emission and bouncing of an infrared light beam, according to various embodiments.

With the pipette assembly at the test location, the pipette robot can query the single, fixed sensor for a distance reading. Turning to FIG. 3A, shown is a sensor 301, which includes a detector 303 and an emitter 305. Also shown in FIG. 3A is a pipette tip 307. With reference to FIG. 3A, where the sensor indicates a distance that is consistent with an object being in front of the sensor at the distance expected for a pipette tip, given the known X, Y, and Z coordinates of the pipette assembly the pipette robot can determine that at least one tip is attached to the pipette assembly. In the example of FIG. 3A, the emitter and the detector of the sensor are depicted as being on a single device. Also, in the example of FIG. 3A, the detector is situated upward along the Z-axis from the emitter. However, other configurations can be used. For instance, the sensor depicted in FIG. 3A can be rotated such that the detector sits forward (or behind) the emitter along either the X or Y axis. Also, the emitter and detector can be on separate devices. Many variations are possible.

Figure 3B:
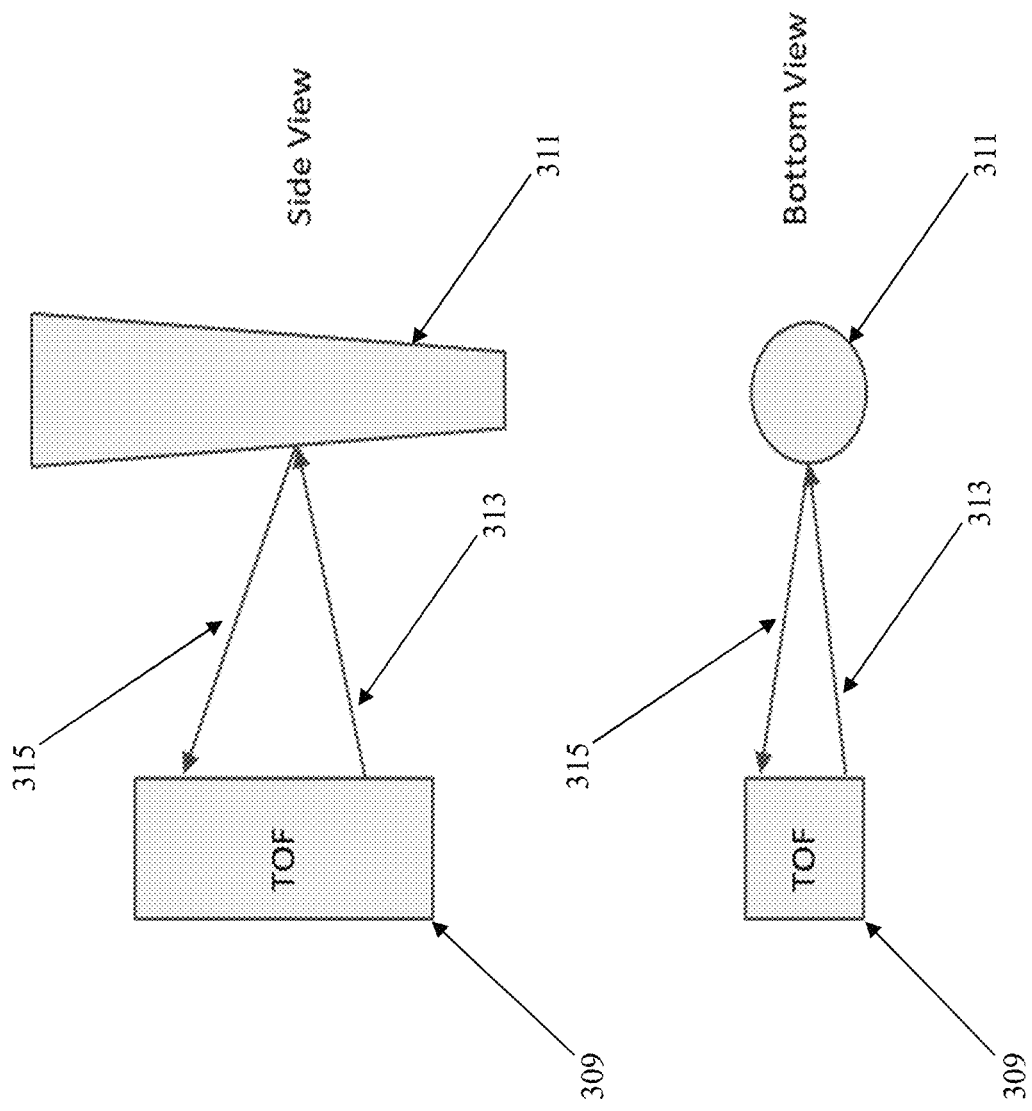
FIG. 3B shows a further view of emission and bouncing of an infrared light beam, according to various embodiments.

As depicted by FIGS. 3A and 3B, the sensor emits a beam, for example an infrared light beam, and the beam bounces off a tip and is detected by a detector of the sensor. For example, shown in FIG. 3B are a sensor 309, a pipette tip 311, as-emitted beam 313, and as-bounced beam 315. The time of flight information recorded from this process provides a distance reading. As further examples, the pipette robot can determine that no tip is attached where the sensor indicates a distance of "infinity," or where the sensor returns an error. It is noted that FIG. 3A and the uppermost image of FIG. 3B each depict a side view of a pipette tip, while the bottommost image of FIG. 3B depicts a bottom view of a pipette tip.

If the sensor indicates a distance greater than the expected distance, the pipette robot can determine that no tips are attached to the pipette assembly. Thresholds can further be set to advantageously account for an acceptable margin of error between the calculated distance. As an illustration, the sensor might indicate such a further-than distance where no tips are attached to the pipette assembly, but the sensor detects a portion of the frame of the pipette robot, and indicates a distance from the sensor to that portion of the frame. In some embodiments, the pipette robot can make this determination where the sensor indicates a distance of "infinity."

In various embodiments, the sensor can directly provide a distance reading, such as a distance reading indicated in millimeters. In other embodiments, the sensor can return one or more values from which a distance can be calculated (e.g., using an Arduino or other microcontroller board, or using a Raspberry Pi or other single board computer). As examples, the sensor can return an elapsed time between light emission and subsequent light detection, or a detected quantity of lux units. Moreover, in various embodiments the pipette robot can use data returned by the sensor to ascertain tip presence/absence without determining a distance. For example, testing can first be employed to determine: a) a quantity (or quantity range) $q_t$ of lux units reported by the sensor where a tip is attached; and b) a quantity (or quantity range) $q_n$ of lux units reported by the sensor when no tip is attached. Such testing might find $q_t > q_n$. Subsequently, when determining whether or not a tip is attached, the pipette robot can query the sensor for a quantity of lux units detected. Where the sensor reports (or reports within a range of) $q_t$ lux units, the pipette robot can determine that a tip is attached. Where the pipette robot reports (or reports within a range of) $q_n$ lux units, the pipette robot can determine that no tip is attached. To facilitate discussion, herein throughout a sensor will be generally referred to as directly providing a distance reading. However, it is to be understood that the sensor can also, for instance, provide one or more values from which a distance can be calculated (e.g., a quantity of lux units can be returned), with the pipette robot either using such values directly or calculating a distance from such values.

Figure 4:
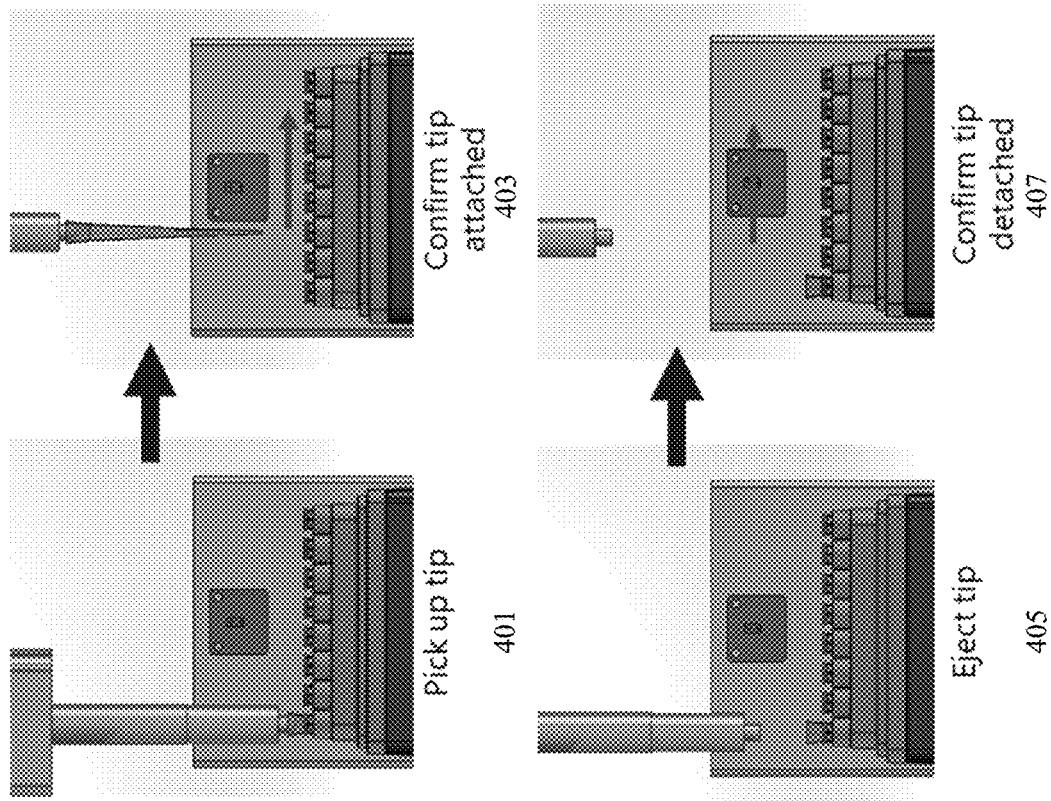
FIG. 4 shows tip pickup, tip ejection, and checking for tip presence, according to various embodiments.

The operations discussed herein for checking for tip presence can, as referenced above, be applied after the pipette robot performs a tip pick up. Such is depicted in the upper frames of FIG. 4. In particular, the upper leftmost frame 401 of FIG. 4 depicts a tip pick up, and the upper rightmost frame 403 of FIG. 4 depicts a checking for tip presence. Additionally, the operations discussed herein for checking for tip presence can be applied after the pipette robot performs a tip ejection operation. As such, the pipette robot can confirm that the tip was successfully ejected. Such is depicted in the lower frames of FIG. 4. In particular, the lower leftmost frame 405 of FIG. 4 depicts tip ejection, and the lower rightmost frame 407 of FIG. 4 depicts a checking for tip presence.

Figure 5:
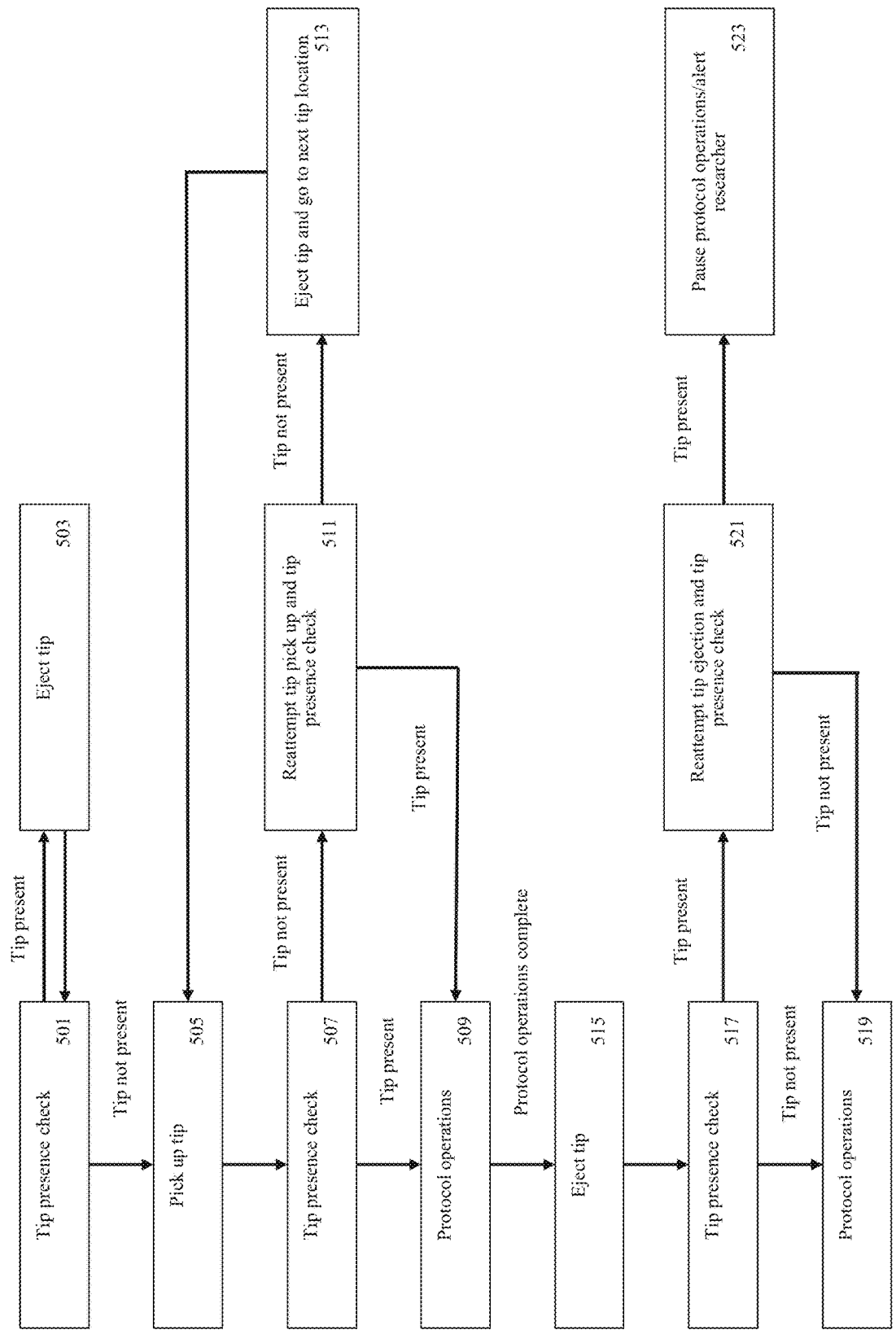
FIG. 5 shows a tip presence check process, according to various embodiments.

Turning now to the flow of FIG. 5, at step 501 the pipette robot can perform an initial tip presence check. Such a check can, for instance, serve to determine whether a tip leftover from prior protocol operations (e.g., parts of a laboratory procedure) inadvertently remains attached to the pipette assembly. Where the pipette robot determines such a leftover tip to be present, flow can proceed to step 503. Otherwise, flow can proceed to step 505. At step 503, the pipette robot can perform a tip ejection operation in an attempt to eject the leftover tip. Subsequently, flow can return to step 501 where the pipette robot can reattempt the tip presence check to see whether the tip ejection operation of step 503 was successful in ejecting the leftover tip. Where the leftover tip is found to now be ejected, flow can proceed to step 505. Otherwise, flow can return to step 503 to reattempt ejection. In this way, the pipette robot can repeat steps 501 and 503 as needed where a leftover tip proves resilient to ejection attempts.

At step 505, the pipette robot can perform a tip pick up operation to attach a fresh tip to the pipette assembly. Then, flow can proceed to step 507. Here, a tip presence check can be performed to ascertain whether the tip pickup operation of step 505 has achieved attachment of the fresh tip to the pipette assembly. Where the check of step 507 finds that attachment of the fresh tip has been achieved, flow can proceed to step 509. Where the check of step 507 instead finds that the attachment has not been achieved, flow can proceed to step 511. At step 511 the pipette robot can repeat the tip pick up operation and the tip presence check. Where the check of step 511 finds that the attachment of the tip has now been achieved, flow can proceed to step 509. Otherwise, flow can proceed to step 513 where the pipette robot can perform an ejection operation to remove from the pipette assembly any tip which has been improperly (e.g., loosely) attached via the unsuccessful preceding pick up operation. Also at step 513, the pipette robot can travel the pipette assembly to a location of a different fresh tip (e.g., to a subsequent slot in a holder of fresh tips). From step 513 flow can return to step 505.

Where flow has proceeded to step 509, the pipette robot can, at this step, perform various protocol operations such as one or more aspiration and/or dispensing operations which are parts of a laboratory procedure. After performing the protocol operations of step 509, flow can proceed to step 515 where the pipette robot can perform a tip ejection operation to eject the tip which was used in the protocol operations. Subsequently, flow can proceed to step 517 where the pipette robot can perform a tip presence check to determine whether or not the tip ejection operation of step 515 was successful. Where step 517 finds the ejection to have been successful, flow can proceed to step 519 where the pipette robot can perform one or more subsequent protocol operations such as ones which comprise a laboratory procedure. It is observed that, in some embodiments, performance of step 519 can, in whole or in part, include a return to step 501.

Where step 517 instead finds the ejection to have not been successful, flow can proceed to step 521. At step 321, the pipette robot can repeat the tip ejection operation and the tip presence check. In some embodiments, in performing step 521 the pipette robot can alter the ejection operation relative to the ejection of step 515, for instance increasing the Z-axis height from which tip ejection is attempted. Where the check of step 521 finds that ejection of the tip has now been achieved, flow can proceed to step 519. Where the check of step 521 instead finds that ejection of the tip has still not been achieved, flow can proceed to step 523 where the pipette robot can pause the protocol operations (e.g., the laboratory procedure). In some embodiments, performance of step 523 can include the pipette robot issuing an alert such as one which endeavors to indicate to a researcher/lab worker that protocol operations have paused due to the failure to eject the tip.

It is noted that, to ease discussion, FIG. 5 has been discussed generally in the context of a single channel pipette. However, in various embodiments analogous operations can be applied to a multichannel pipette. Accordingly, for instance, where a multichannel pipette is employed, the discussed operations of FIG. 5 which check for tip presence can check for tip presence with respect to each channel of the multichannel pipette. Likewise, the discussed operations of FIG. 5 which attempt tip pick up can attempt tip pick up with respect to each channel of the multichannel pipette. Further likewise, the discussed operations of FIG. 5 which attempt tip ejection can attempt tip ejection with respect to each channel of the multichannel pipette.

While the above embodiment is described in the context of a single channel pipette, this single fixed sensor embodiment can be readily adapted to be used with a multichannel pipette by moving each pipette head of the multichannel pipette in front of the sensor. In such an embodiment, care must be taken to ensure the pipette head is placed at a distance from the fixed sensor such that only one channel of the multichannel pipette is within the FOV of the sensor.

Tip Presence Check: Multichannel Pipette, Multiple Fixed Sensors

According to a second mode of operation, the pipette assembly can employ a multichannel pipette (e.g., a robot tool with multiple pipette heads), and the pipette robot can use multiple, fixed sensors to determine, for each of the channels of the multichannel pipette, whether or not at least one tip is attached for that channel. It is noted that, as discussed in greater detail below, according to a different mode of operation the pipette robot can instead use a single unfixed sensor when performing a tip presence check in connection with a multichannel pipette. For the second mode of operation (i.e., the mode of operation discussed in this section) there can be, in particular, a fixed sensor for each channel of the multichannel pipette. As an example, the multiple sensors can be positioned along a horizontal line, and the inter-sensor spacing can match the inter-channel spacing of the pipette. Akin to the first mode of operation, in the second mode of operation the pipette robot can select a location within the bay to which to travel the pipette assembly, and then travel the pipette assembly to that position. For the second mode of operation, in selecting the location to which to travel the pipette assembly employing a multichannel pipette, the pipette robot can act generally as discussed in connection with the first mode of operation. However, for the second mode of operation the pipette robot can take into account the locations of each of the multiple, fixed sensors. Accordingly, the pipette robot can choose a location to which to travel the pipette assembly, such that the chosen location causes any one or more tips of a given channel to align with a fixed sensor which corresponds to that channel. For the second mode of operation, the pipette robot can act in a manner analogous to that of the first mode of operation to have each of the multiple, fixed sensor indicate a distance, and to ascertain, which respect to each sensor and channel, whether: a) at least one tip is attached for the channel; or b) no tip is attached for the channel. As discussed above in connection with FIG. 2B, in various embodiments testing can be utilized in selection of the test location. As noted there, a single fixed sensor can be used, and various Z-axis positions of the pipette assembly can be tried to determine whether the sensor can detect the tip at those positions. In various embodiments where multiple fixed sensors are used, such testing can instead use multiple sensors. In particular, rather than traveling the pipette assembly to the various Z-axis positions, the multiple sensors can be situated at such Z-axis positions and the multiple sensors can be used to check the various Z-axis positions simultaneously.

Tip Presence Check: Multichannel Pipette, Single Unfixed Sensor

According to a third mode of operation, the pipette assembly can employ a multichannel pipette, and the pipette robot can use a single, unfixed sensor. For this third mode of operation, the pipette robot can operate generally as discussed in connection with the second mode of operation. However, for the third mode of operation the pipette robot can use one or more motors to travel the single sensor to each of the multiple sensor locations discussed in connection with the second mode of operation. Accordingly, with each travel to one of the locations, the single, unfixed sensor can become aligned with a corresponding channel of the multichannel pipette. Also with each visit, the pipette robot can request a distance measurement from the single, unfixed sensor. In this way, akin to the second mode of operation, the pipette robot can get a distance reading for each channel. Further akin to the second mode of operation, the pipette robot can use these reported distances to determine, for each channel, whether: a) at least one tip is attached for the channel; or b) no tip is attached for the channel.

Tip Seal Check: Single Channel Pipette, Multiple Fixed Sensors

According to a fourth mode of operation, the pipette assembly can employ a single channel pipette, and the pipette robot can utilize a set of multiple fixed sensors to determine whether or not a single tip is attached to the single channel pipette with a proper seal. In some embodiments, the multiple fixed sensors can be used to determine whether or not one and only one tip is attached. According to an example, the multiple sensors can be positioned along a vertical line, attached to the robot frame. In some embodiments, the quantity of sensors can be sufficient, for instance when taking into account the FOVs of the sensors, to provide sensory coverage for a vertical length corresponding to a space surrounding the tip of the pipette. In other embodiments, the quantity of sensors can be sufficient, for instance when taking into account the FOVs of the sensors, to provide sensory coverage for a vertical length equivalent to the total length of: a) up to n (e.g., n=6) pipette tips (e.g., of a tip type being employed, or a of maximally-long usable tip type); and, in some embodiments, also b) a lowermost portion of the single channel pipette.

For the fourth mode of operation, the pipette robot can select a location within the bay to which to travel the pipette assembly, and can subsequently travel the pipette assembly to the selected location. In selecting the location to which to travel the pipette assembly, the pipette robot can take into account: a) the specific type of tip being employed; b) the locations of the multiple fixed sensors; and c) the fields of vision (FOVs) of the multiple fixed sensors. In particular, the pipette robot can select the location to which to travel the pipette assembly such that, when the pipette assembly is at the location, the zero or more tips attached to the pipette assembly—and in some embodiments the lowermost portion of the single channel pipette—are within the FOVs of the multiple sensors. After traveling the pipette assembly to the selected location, the pipette robot can query each of the multiple sensors for a distance reading. Where a given sensor indicates a distance which is consistent with an object being in front of that sensor and at a location whose X and Y coordinates match the X and Y coordinates of the location to which the pipette robot has traveled the pipette assembly, the pipette robot can determine that a portion of a tip (or in some embodiments either a portion of a tip or a lowermost portion of the single channel pipette) is in front of that sensor. Where a given sensor indicates a distance further than such a location whose X and Y coordinates match the X and Y coordinates of the location to which the pipette robot traveled the pipette assembly (e.g., where the sensor indicates a distance of "infinity"), the pipette robot can determine that no portion of a tip (or, in some embodiments, that neither a portion of a tip nor a lowermost portion of the single channel pipette) is in front of that sensor. Subsequently, the pipette robot can consider the total length subtended by those of the sensors which have been determined to have in front thereof a portion of a tip (or, in some embodiments, either a portion of a tip or a lowermost portion of the single channel pipette).

Next, the pipette robot can consult a reference (e.g., an equation, a lookup table, or an appropriately-trained machine learning model (MLM)) using this total length. In some embodiments, the reference can hold one or more known length readings of where a tip is properly attached for the given pipette assembly being used. Where the total length subtended by the noted sensors matches such a known length reading held by the reference, the pipette robot can ascertain that a single tip is attached with a proper (e.g., tight) seal. In other embodiments, the reference can take into account: a) the length of the specific tip type being employed; b) the position to which the pipette robot has moved the pipette assembly; and c) the FOVs of the sensors. The reference can indicate that: a) where the noted total length is equal to s length units (or equal to within a threshold) (e.g., s=3 cm), only one tip is attached to the single channel pipette, and the tip is attached with a proper (e.g., tight) seal; b) where the noted total length is less than s length units (or less than within a threshold), no tips are attached to the single channel pipette; and c) where the noted total length is greater than s length units (or greater than within a threshold), either: i) one tip is attached, but without a proper seal (e.g., the tip is attached loosely); or ii) multiple tips are attached to the pipette.

Figure 6:
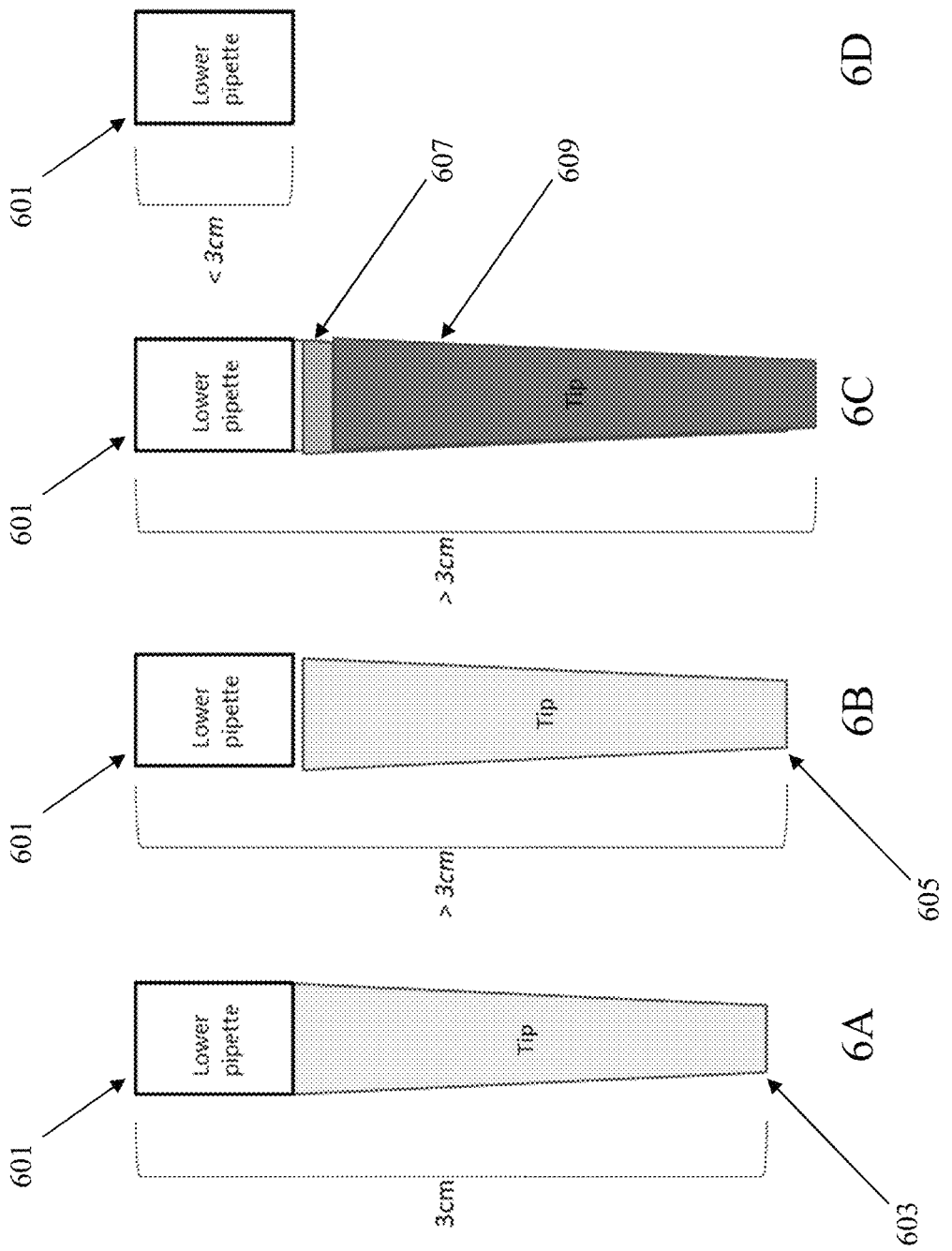
FIG. 6A shows an example of single channel pipette/multiple fixed sensors tip seal check functionality, according to various embodiments.
FIG. 6B shows a further example of single channel pipette/multiple fixed sensors tip seal check functionality, according to various embodiments.
FIG. 6C shows another example of single channel pipette/multiple fixed sensors tip seal check functionality, according to various embodiments.
FIG. 6D shows an additional example of single channel pipette/multiple fixed sensors tip seal check functionality, according to various embodiments.

Four illustrative examples of the functionality of the fourth mode of operation will now be discussed with reference to FIGS. 6A-6D. Shown in FIGS. 6A-6D are a lower pipette portion 601 and pipette tips 603-609. For the examples of FIGS. 6A-6D, s=3 cm, and the pipette robot has moved the pipette assembly as discussed. In the circumstance of FIG. 6A, one tip is attached to the pipette, and it is attached with a tight seal. This causes the depicted total length of the tip and the lowermost portion of the pipette to be equal to 3 cm. The reference can reflect that such a length of 3 cm is indicative of a single tip, properly attached. In the circumstance of FIG. 6B, one tip is attached but is attached loosely. As such, the tip hangs lower and the total length of the tip and the lowermost portion of the pipette is longer than the total length in FIG. 6A (i.e., longer than 3 cm). In the circumstance of FIG. 6C, multiple tips are attached. As such the totality of the multiple tips descend lower than the circumstance of the single, tightly-attached tip of FIG. 6A, and the total length of the multiple tips and the lowermost portion of the pipette is also lower than the total length in FIG. 6A. In agreement with both FIG. 6B and FIG. 6C, the reference can reflect that such a length of longer than 3 cm is indicative of either a single tip improperly attached, or of multiple tips being attached. Turning to FIG. 6D, depicted is a circumstance where no tip is attached to the pipette. This causes the total length (i.e., the length of the lowermost portion of the pipette, sans any tips) to be less than the total length of FIG. 6A, that is to say less than 3 cm. In agreement with FIG. 6D, the reference can reflect that such a length of less than 3 cm is indicative of no tips being attached.

Tip Seal Check: Single Channel Pipette, Single Unfixed Sensor

According to a fifth mode of operation, the pipette assembly can employ a single channel pipette, and the pipette robot can use a single, unfixed sensor to make the same determinations made in the fourth mode of operation. For this fifth mode of operation, the pipette robot can operate generally as discussed in connection with the fourth mode of operation, but for the fifth mode of operation the pipette robot can use one or more motors to travel the single, unfixed sensor to the positions referenced in discussing the fourth mode of operation, that is to say positions sufficient to—where the pipette robot requests a distance measurement from the sensor at each visited position, and taking into account the FOV of the sensor—provide sensory coverage for the vertical length discussed in connection with the fourth mode of operation. In some embodiments, the positions can be located along a vertical line. As such, in the fifth mode of operation the pipette robot can act as discussed in connection with the fourth mode of operation, but moving the single, unfixed sensor to each of the noted positions, requesting a distance measurement from the single, unfixed sensor when at such position, and then utilizing the totality of measurements collected via the multiple visited positions as discussed in connection with the fourth mode of operation. Accordingly, for instance, the pipette robot can consider the total length subtended by those of the visited positions indicating measurements indicative of a tip portion (or, in some embodiments, either a tip portion or a lowermost pipette portion), and then consult the reference to determine whether no tip is attached, a single tip is attached and attached properly, or either: a) multiple tips are attached; or b) a single tip is attached but is attached improperly.

Tip Seal Check: Multichannel Pipette, Multiple Fixed Sensors

According to a sixth mode of operation, the pipette assembly can employ a multichannel pipette, and the pipette robot can use multiple, fixed sensors to make the determinations made in the fourth and fifth modes of operation. For this sixth mode of operation, the pipette robot can operate generally as discussed in connection with the fourth and fifth modes of operation, but for the sixth mode of operation there can be, for each channel of the multichannel pipette, a set of sensors of the sort discussed in connection with the fourth mode of operation. The spacing of the sets can match the inter-channel spacing of the multichannel pipette. As such, the set of sensors for each channel can provide, for that channel, sensory coverage for a vertical length equivalent to n pipette tips, and in some embodiments also a lowermost portion of the pipette of that channel. The set of sensors for a given channel can, in some embodiments, be attached to the frame of the pipette robot and/or be arranged in a vertical line. For each channel, the pipette robot can act as discussed in connection with the fourth mode of operation to: a) consider for that channel the total length subtended by those sensors of that channel which have been determined to have in front thereof a portion of a tip (or, in some embodiments, either a portion of a tip or a lowermost pipette portion); b) consult the reference with respect to that channel; and c) determine for that channel that: I) a single tip is attached and is attached properly; II) that no tips are attached for that channel; or III) either: 1) that one tip is attached for the channel but is attached improperly; or 2) that multiple tips are attached for the channel. As such, via the foregoing the pipette robot can, in the sixth mode of operation, make a tip placement determination for each channel of the multichannel pipette.

Tip Seal Check: Multichannel Pipette, Multiple Unfixed Sensors

According to a seventh mode of operation, the pipette assembly can employ a multichannel pipette, and the pipette robot can use multiple unfixed sensors—one unfixed sensor per channel—to make the determinations of the fourth-sixth modes of operation. For the seventh mode of operation, the pipette robot can operate generally as discussed in connection with, in particular, the fifth and sixth modes of operation. However, for the seventh mode of operation the pipette robot can, for each channel of the multichannel pipette, have a single unfixed sensor. Further, the pipette robot can use one or motors to travel the sensor for a given channel to each of the multiple per-channel sensor locations discussed in connection with the sixth mode of operation, Akin to the aforementioned operations of the fifth mode of operation, for each channel the pipette robot can have the sensor for the channel, with each visited position, report a distance. Using the reported distances for the channel, the pipette robot can operate in a manner analogous to that discussed to, for the channel, consult a reference and determine that: I) a single tip is attached and is attached properly; II) that that no tips are attached for that channel; or III) either: 1) that one tip is attached for the channel but is attached improperly; or 2) that multiple tips are attached for the channel.

Tip Seal Check: Multichannel Pipette, Single Unfixed Sensor

According to an eighth mode of operation, the pipette assembly can employ a multichannel pipette and can use a single, unfixed sensor. The functionality of the eighth mode of operation can be like that of the seventh mode of operation, but with the pipette robot moving the single sensor to all of the discussed sensor positions across all of the channels. By having the sensor, for each channel, report a distance for each visited position, the pipette robot can operate in a manner analogous to that discussed to make a tip placement determination for each channel of the multichannel pipette.

Tip Seal Check: Further Implementations

In some embodiments, the functionality of the first-third modes of operation can be adapted to allow the pipette robot to determine for a single pipette—or for each of the channels of a multichannel pipette—among one of: a) either multiple tips are attached or a single tip is attached but attached improperly; or b) either no tip is attached or one and only one tip is attached and is attached properly. In particular, the first-third modes of operation can be adapted so that the locations of the single, fixed sensors—or the locations to which the unfixed sensors travel—can be chosen to be at locations a given distance downward on the z-axis from expected locations to which properly attached tips—or given properly attached tips of a multichannel pipette—would descend. For example, where such a properly attached tip is expected to descend to a location 10 cm from an uppermost portion of the bay of the pipette robot, the sensor can be located at (or travel to) 10.2 cm from the uppermost portion.

Figure 7:
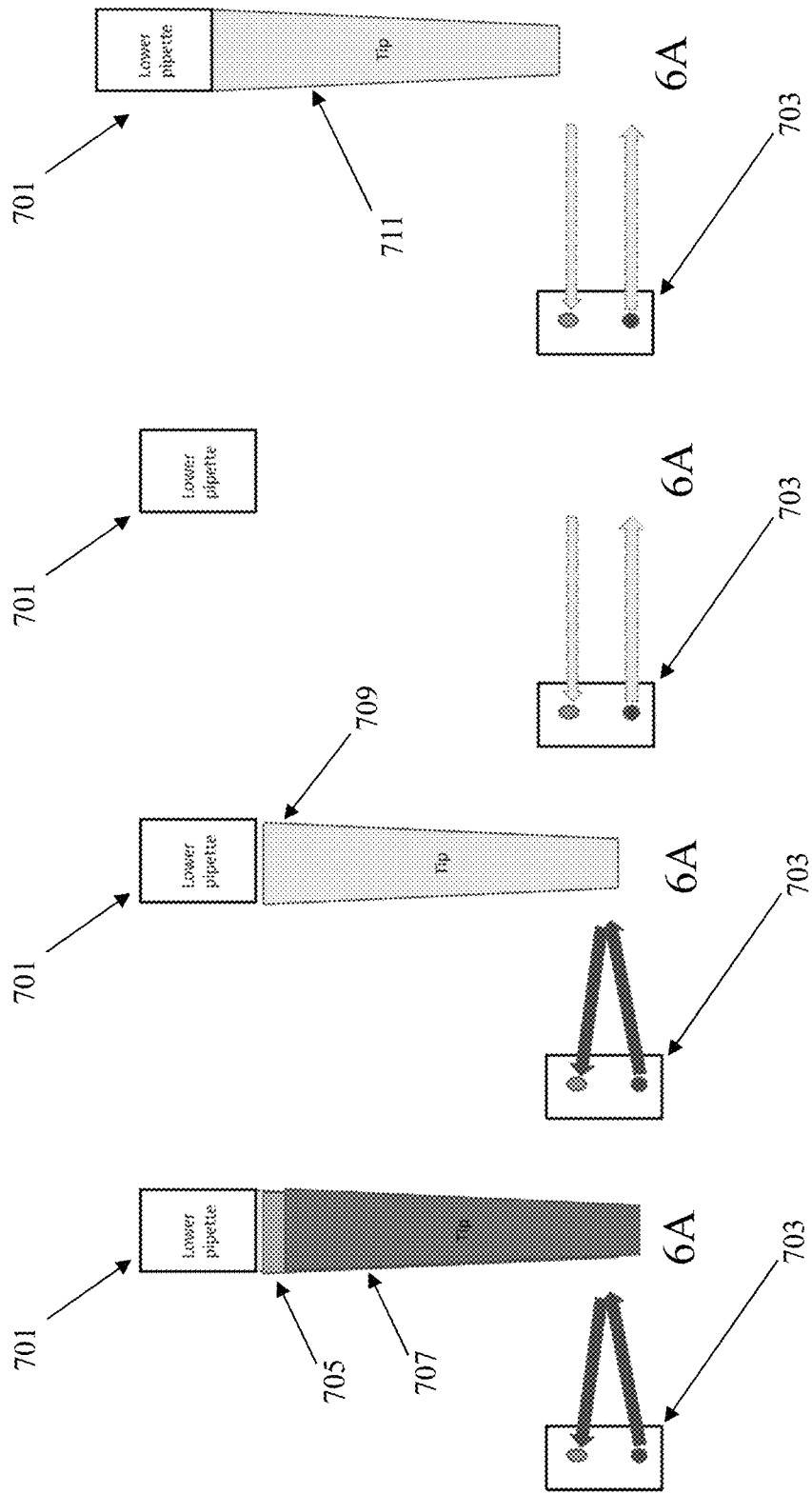
FIG. 7A shows an example of functionality of a further tip seal check implementation, according to various embodiments.
FIG. 7B shows a further example of functionality of a further tip seal check implementation, according to various embodiments.
FIG. 7C shows another example of functionality of a further tip seal check implementation, according to various embodiments.
FIG. 7D shows an additional example of functionality of a further tip seal check implementation, according to various embodiments.

Shown in FIGS. 7A-7D are a lower pipette portion 701, a sensor 703, and pipette tips 705-711. In particular, FIGS. 7A and 7B show circumstances where the sensor reports a distance which is consistent with an object being in front of the sensor and at a location whose X and Y coordinates match—when taking into account the trans-channel width where a multichannel pipette is used—the X and Y coordinates of the location to which the pipette robot has traveled the pipette assembly. In agreement with that which has been discussed, such report of the sensor can occur either where, as in FIG. 7A, multiple tips are attached or, as in FIG. 7B, where a single tip is attached but attached improperly (e.g., loosely). Then, FIGS. 7C and 7D illustrate circumstances where the sensor reports a distance farther than such a location whose X and Y coordinates match the location to which the pipette robot traveled the pipette assembly. In agreement with that which has been discussed, such report of the sensor can occur either where, as in FIG. 7C, no tip is attached, or, as in FIG. 7D, where one and only one tip is attached and attached properly. To distinguish between these two possibilities, the functionality now being discussed can be preceded by an appropriate one of the first-third modes. That is to say, via the appropriate one of the first-third modes it can be determined whether at least one tip is attached. Then, where performing one of the first-third modes indicates that at least one tip is attached, the discussed circumstance of the pipette robot learning that either no tips are attached, or one single tip is attached and attached properly can—in light of the further information that at least one tip is attached—be interpreted by the pipette robot to be that one single tip is attached and is attached properly.

Figure 8:
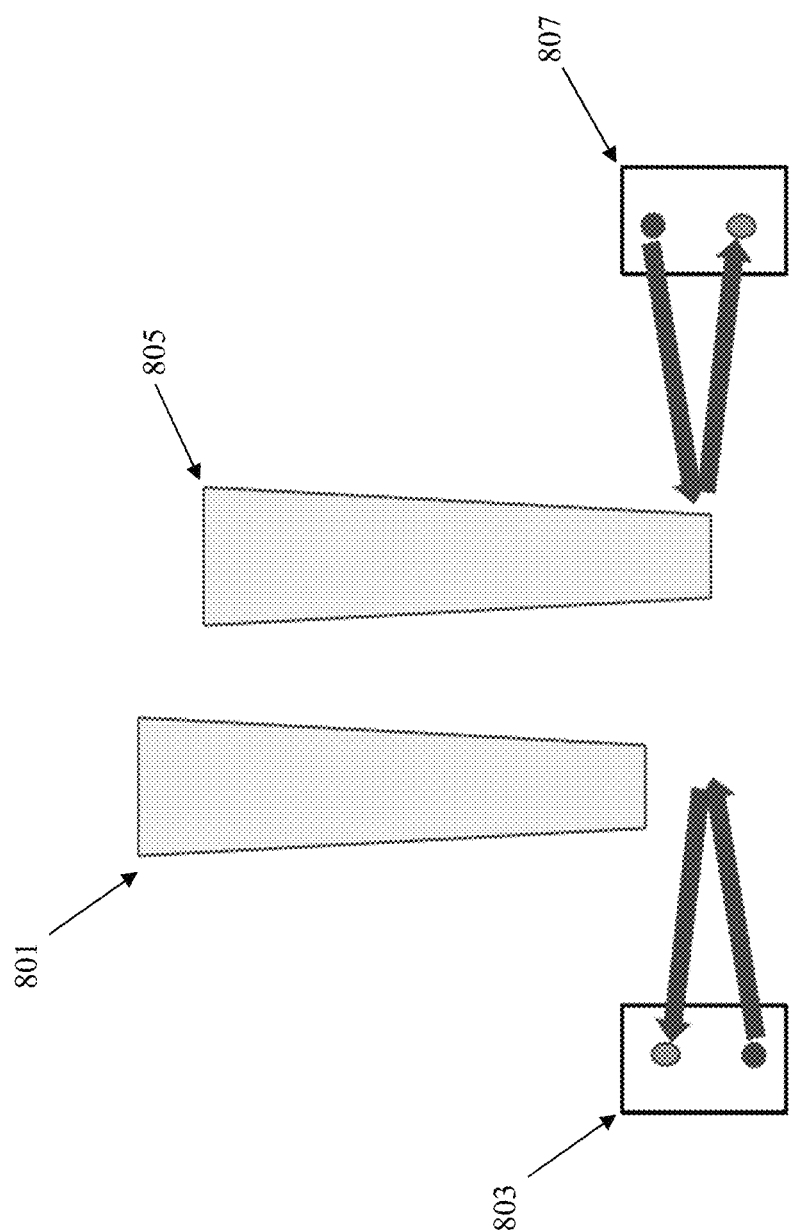
FIG. 8 shows yet another example of functionality of a further tip seal check implementation, according to various embodiments.

Further to FIGS. 7A-7D, shown now is FIG. 8. Here, shown are two tips (801, 805) of two channels of a multichannel pipette. Also shown in FIG. 8 are two sensors (803, 807), one situated near each of the two tips. In one scenario, each of the two depicted sensors can be a fixed sensor. In another scenario, each of the two depicted sensors can represent two locations to which a single, unfixed sensor has been moved. Turning to the sensor of the first channel (803, depicted leftward), the sensor reports a distance indicative of it not having sensed the tip of the first channel (801, depicted leftward). As such for the first channel the pipette robot can ascertain that that either no tip is attached, or that one tip is attached and is attached properly.

As referenced, where the pipette robot also makes a determination for this channel as to whether or not at least one tip is attached, the pipette robot can refine the just-noted determination so as to ascertain which one of: a) no tip is attached; and b) one tip is attached and is attached properly describes the condition of the first channel. Further, for the second channel of FIG. 8 the pipette robot can determine that either multiple tips are attached, or one tip is attached but is attached improperly.

Single Sensor Operations for Multichannel Pipettes

Figure 9:
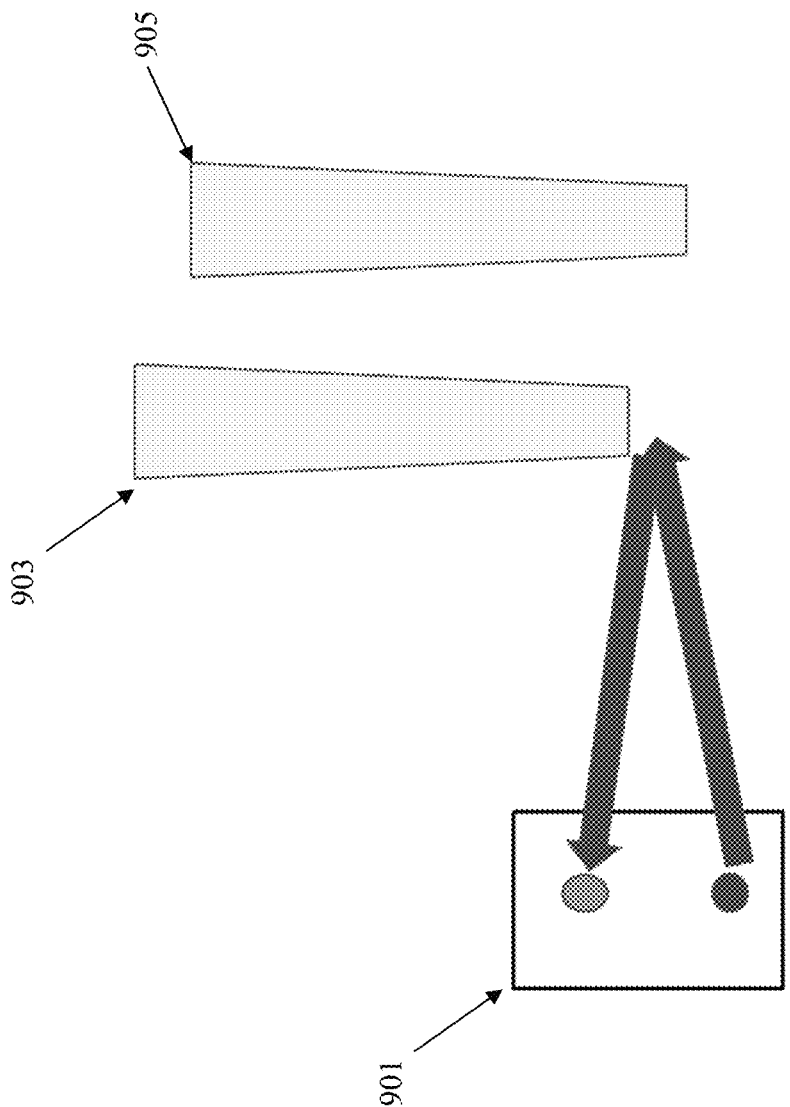
FIG. 9 shows functionality regarding single sensor operations for multichannel pipettes, according to various embodiments.

With reference to FIG. 9, it is noted that in various embodiments a single fixed or unfixed sensor can be used in conjunction with a multichannel pipette. Shown in FIG. 9 are a single sensor 901, and pipette tips 903 and 905. As depicted in FIG. 9, given the location at which the single sensor is situated (i.e., fixed at or moved to), the single sensor indicates a distance measurement indicative of it having sensed the lower-hanging second tip of the second channel (905, rightward) rather than the higher-hanging tip of the first channel (903, leftward). As such, a configuration such as this can allow the pipette robot to learn that at least one channel of the multichannel pipette has a lower-hanging tip. For example, where the one sensor is fixed at (or moved to) a location discussed in connection with the first and third modes of operation, the pipette robot can learn whether at least one channel of the multichannel pipette has at least one tip attached (e.g., where the sensor indicates a distance indicating that at least one channel of the multichannel pipette has a low hanging tip, the pipette robot can ascertain that at least one channel of the multichannel pipette has at least one tip attached). As another example, where the one sensor is fixed at (or moved to) a location as discussed in connection with FIGS. 7A-7D and the text corresponding thereto, the pipette robot can obtain information as follows. Where the sensor indicates a distance indicating that at least one channel of the multichannel pipette has a low hanging tip, the pipette robot can ascertain that—for at least one channel of the multichannel pipette—either multiple tips are attached or one tip is attached but attached improperly. Where the sensor indicates a distance indicating that no channel of the multichannel pipette has a low hanging tip, the pipette robot can ascertain that each channel of the multichannel pipette either has no tip attached, or one single tip which is attached properly.

Distance Sensing: Overview

Figure 10A:
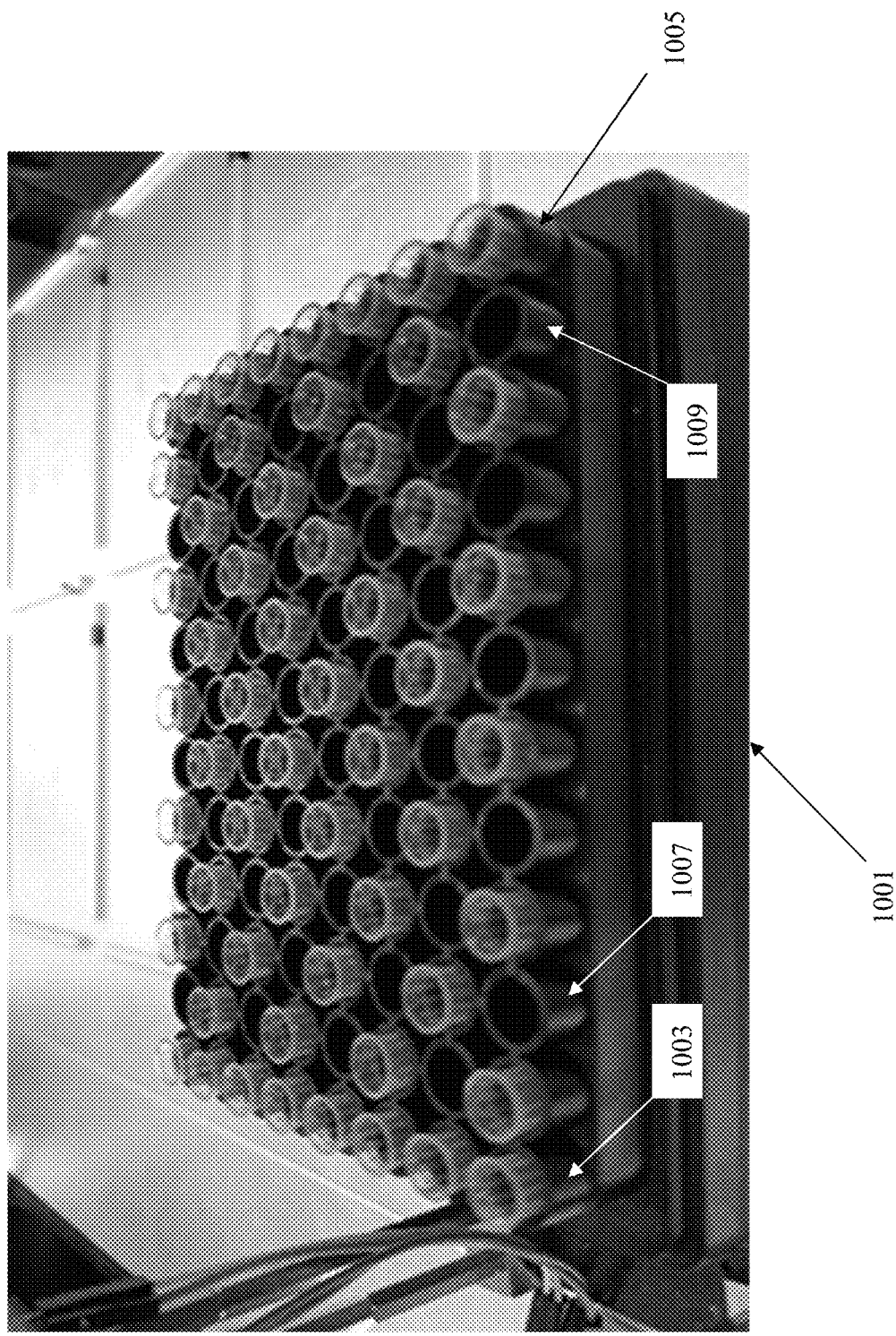
FIG. 10A shows a pipette tip holder, according to various embodiments.

Turning to FIG. 10A, shown is a pipette tip holder 1001. As depicted, certain slots of the holder—for instance, slots 1003 and 1005—contain tips while certain slots of the holder—for instance, slots 1007 and 1009—do not contain tips. The depicted holder has 96 slots. According to various embodiments, a pipette tip holder can have fewer than or more than 96 slots. The pipette robot can move a sensor, of the sort discussed, over the tip holders such that the sensor visits each slot of the holder. As an example, the sensor can be attached to the end of the pipette assembly, and the pipette robot can move the sensor by traveling the pipette assembly. The pipette robot can be aware of the X and Y coordinates of each slot, and therefore can map each visited position with a given slot. Then, with each visited slot, the pipette robot can request that the sensor report a sensor value, such as a distance or quantity of lux units. As such, the pipette robot can possess, for each slot, a reported sensor value (e.g., a distance or a quantity of lux units).

Figure 10B:
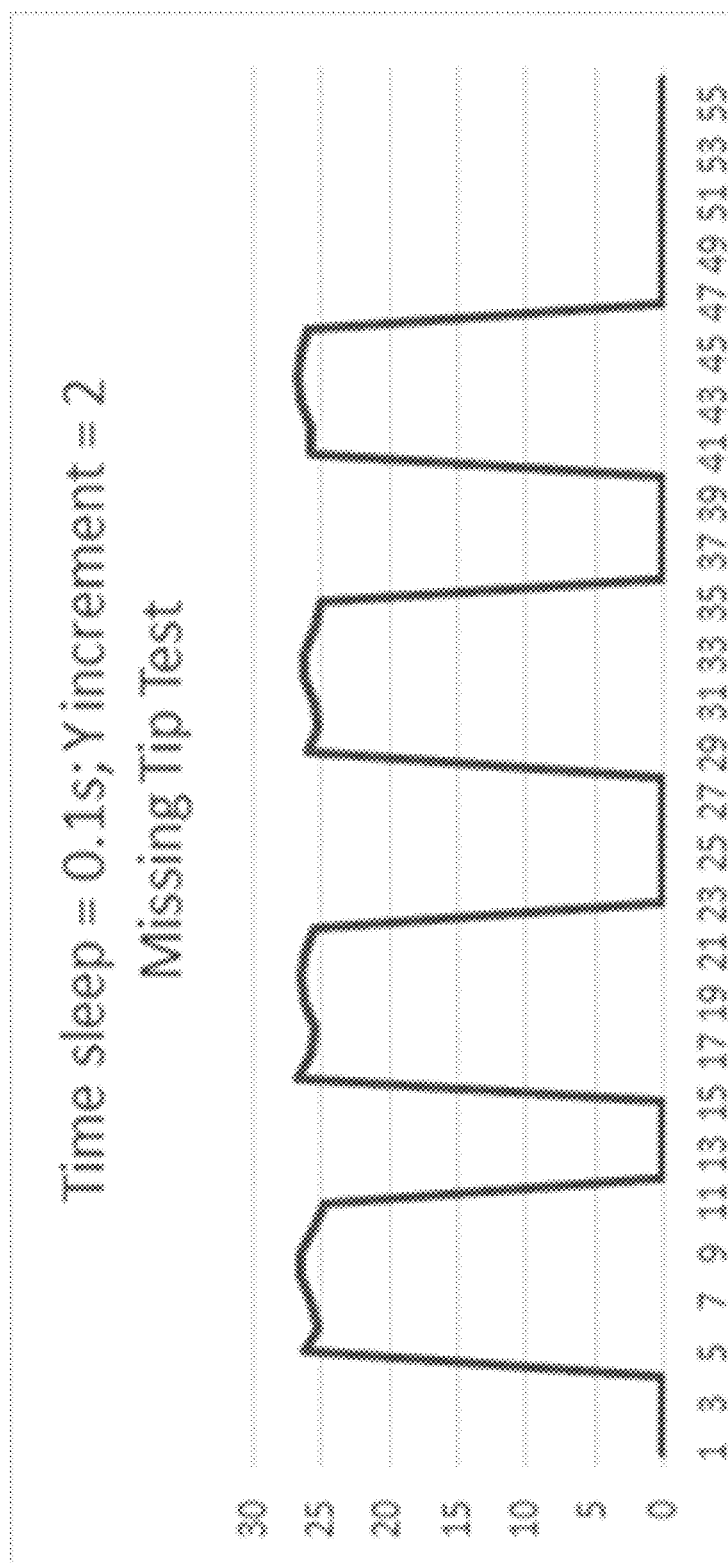
FIG. 10B shows a reported distances plot, according to various embodiments.

Depicted in FIG. 10B is a plot of such reported sensor values. The Y-axis of the plot indicates quantities of lux units reported by the sensor. The X-axis of the plot indicates distance traveled by the sensor from an origin, in millimeters. In the example of FIG. 10B, the sensor travels over eight slots, where: a) the travel distance range of approximately 4 mm-12 mm corresponds to the first slot; b) the travel distance range of approximately 12 mm-15 mm corresponds to the second slot; c) the travel distance range of approximately 15 mm-23 mm corresponds to the third slot; d) the travel distance range of approximately 23 mm-28 mm corresponds to the fourth slot; e) the travel distance range of approximately 28 mm-36 mm corresponds to the fifth slot; f) the travel distance range of approximately 36 mm-40 mm corresponds to the sixth slot; g) the travel distance range of approximately 40 mm-47 mm corresponds to the seventh slot; and h) the travel distance range of approximately 47 mm-55 mm corresponds to the eighth slot.

In the plot, for certain travel distance ranges/slots (e.g., approximately 15 mm-23 mm/third slot) a quantity of lux units on order of 25 lux units is shown. For other travel distance ranges/slots (e.g., approximately 23 mm-28 mm/fourth slot) a quantity of lux units order of 0 lux units is shown. The larger quantities of lux units (i.e., 25 lux units) are indictive of full slots. The smaller quantities of lux units (i.e., 0 lux units) are indictive of empty slots. For a travel distance range corresponding to a full slot, the sensor reports the quantity of lux units reflected from the tip which occupies the slot. For a travel distance range corresponding to an empty slot, the sensor reports the quantity of lux units reflected from the vacant well of the slot. Therefore, comparatively speaking, such an occupying tip is closer to the sensor (leading to a greater amount of reflected light) while such a well is farther from the sensor (leading to a lesser amount of reflected light), causing the sensor to report larger quantities of lux units for full slots and smaller quantities of lux units for empty slots. As such, FIGS. 10A and 10B provide an example of the ability of the pipette robot to sense distances. The operations discussed in connection with FIGS. 10A and 10B can be applied to functionality including liquid sensing and aspiration depth control, and to deck component height determination, as discussed hereinbelow.

Distance Sensing: Liquid Sensing and Aspiration Depth Control

Figure 11:
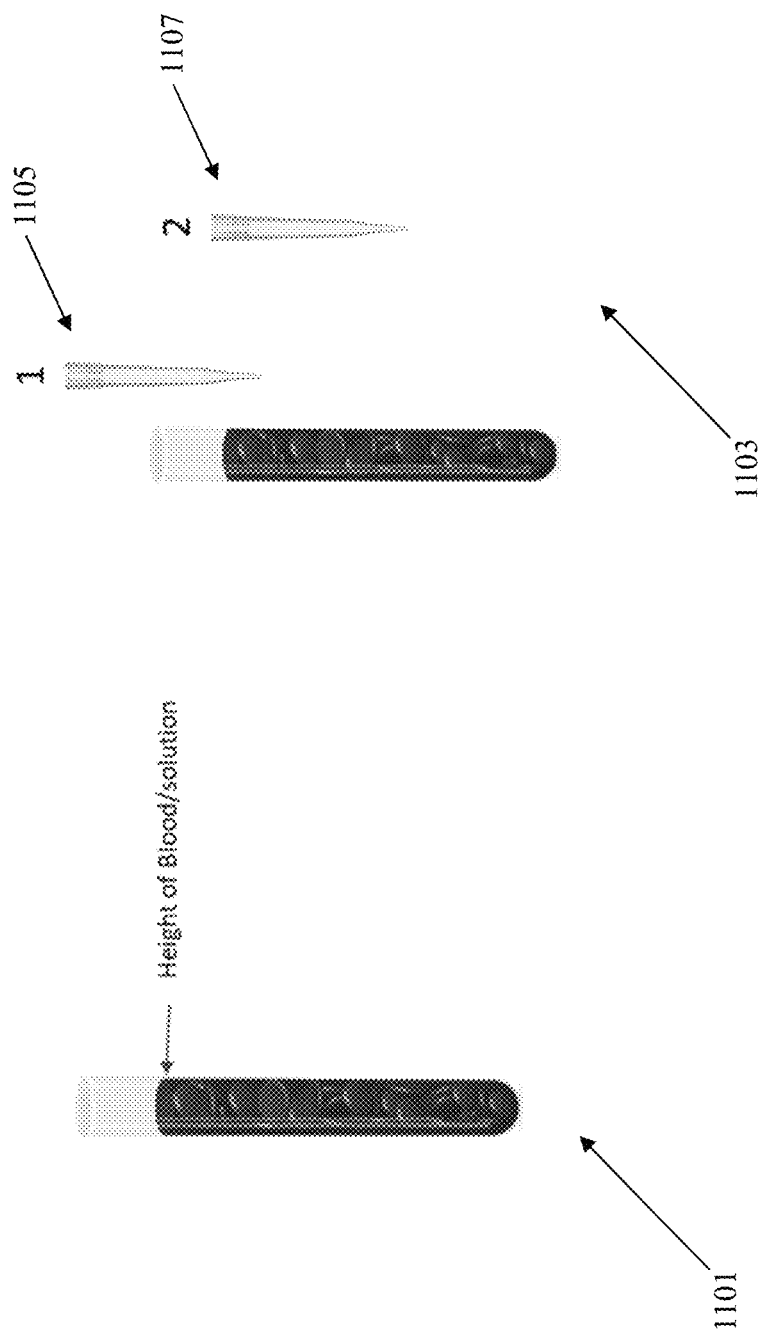
FIG. 11 shows an example of the application of distance sensing to liquid sensing and aspiration depth control, according to various embodiments.

As an example, distance sensing functionality can be utilized by the pipette robot in liquid sensing and aspiration depth control. With reference to FIG. 11, as depicted leftward in the FIG. 1101) the surface of a blood, solution, or other liquid within a test tube or other vessel can have a particular height. Turning to the rightward portion (1103) of FIG. 11, where a tip descends too deeply into the liquid of the test tube—as depicted by tip 1107 of the figure—the outside of the tip can become coated with the liquid of the test tube. This can lead to difficulties, such as the liquid (e.g., blood) being subsequently dripped about the bay as the pipette assembly is moved. Instead, the tip should descend to an appropriate depth—as depicted by tip 1105 of the figure—which is deep enough to allow the liquid of the test tube to be pipetted, but not so deep as to lead to the noted coating of the tip. By knowing the height of the surface of the liquid in the test tube, the pipette robot can travel the tip to such an appropriate depth. As such, according to various embodiments a determination can be made as to the height of the surface of a liquid within a vessel which is situated inside the bay of the pipette robot pipette robot. The vessel can be, as just some examples, a test tube, a beaker, or a flask. To facilitate discussion, the vessel will be generally referred to as a "test tube," with the understanding that the vessel can also be, for instance, a beaker or flask. For those embodiments where a determination of liquid surface height is made, one or more sensors of the sort discussed can be used.

Where a single channel pipette is being used, a single, fixed sensor can be employed. Where a multichannel pipette is being used, as one example multiple fixed sensors can be used, there being one fixed sensor for each channel. As another example where a multichannel pipette is being used, a single unfixed sensor can be used and moved to different positions corresponding each channel of the multichannel pipette. According to various embodiments, such fixed and unfixed sensors can emit and detect light having a wavelength between 500 and 850 nm.

Figure 12:
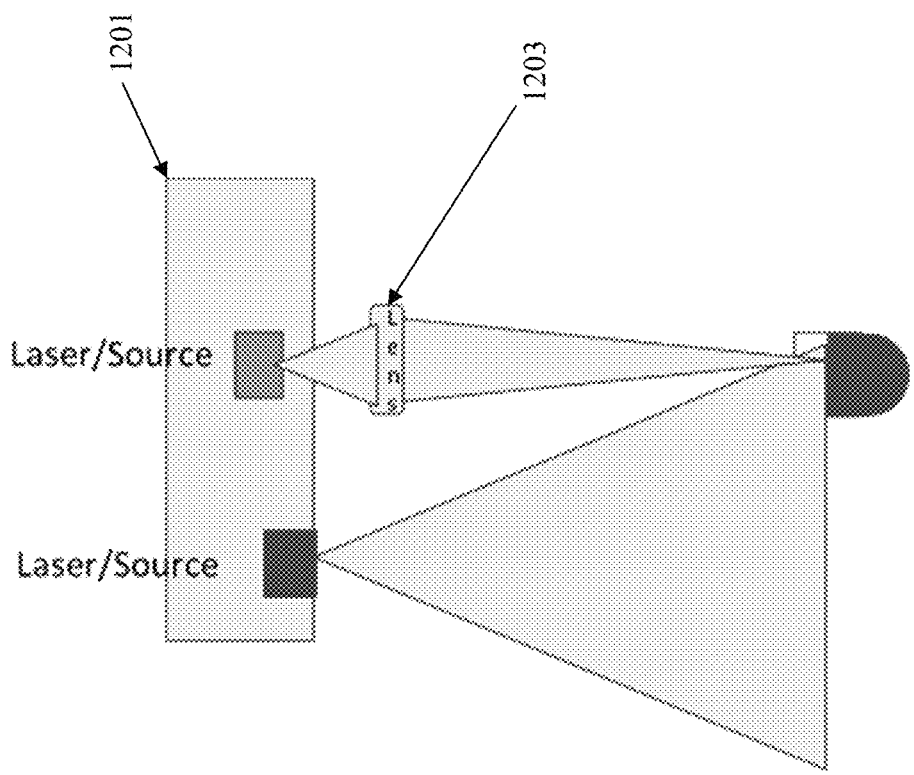
FIG. 12 shows a further example of the application of distance sensing to liquid sensing and aspiration depth control, according to various embodiments.

As to the positions at which the fixed sensors can be placed, and the positions to which the unfixed sensor can be moved, such a position can be one which allows a test tube being pipetted to be within the FOV of the sensor, and in particular the surface of the liquid held in the test tube to be within the FOV of the sensor. Shown in FIG. 12 are a sensor 1201 and a lens 1203. In some embodiments one or more lenses can, as depicted by FIG. 12, be used to adjust the FOV of a sensor in a way that facilitates the surface of the liquid to be within the FOV of the sensor. Such lenses can be placed on a detector of the sensor, on a source (e.g., laser) of the sensor, or on both components. As one example, such a sensor can be placed on the pipette assembly aligned with but outside of the pipette tip of a single channel pipette, or of a given tip of a multichannel pipette. As another example, such a tip can be placed such that its field of view looks down and through the tip. In these ways, a sensor can have within its FOV the surface of a liquid being pipetted by the pipette robot.

For embodiments which implement such sensing of liquid surface height and which act to descend tips to the discussed appropriate depths, the pipette robot can act as follows. Where fixed sensors are used (e.g., sensors which emit and detect light having a wavelength between 500 and 850 nm), prior to pipetting liquid the pipette robot can generally align (e.g., taking into account sensor FOV), along the X and Y axes, a given tip with a given test tube (or multiple tips of a multichannel pipette with multiple test tubes). Then, the pipette robot can descend the tip (or tips) to a Z-axis height which is above the surface of the liquid and which causes the surface of the liquid to be within the FOV(s) the sensor(s). Subsequently, the pipette robot can request that the sensor or sensors report distances. With such sensor report(s), the pipette robot can know the distance between a given sensor and the surface of the liquid within the FOV of the sensor. Using this distance or distances, the pipette robot can instruct the pipette assembly to descend the tip(s) to an appropriate height which allows for pipetting while preventing tip contamination by the liquid being pipetted. Where one more unfixed sensors are used, the pipette robot can operate in a similar way, but additionally act to move such an unfixed to an appropriate location. For instance, for a multichannel pipette, for each channel the pipette robot can move the sensor to a position which allows the liquid being pipetted by that channel to be within the FOV of the unfixed sensor.

In various embodiments, the pipette robot can utilize the distance reported by a given sensor for a given test tube to calculate the volume of a liquid held by the test tube. For example, the pipette robot can convert the reported distance to a Z-axis height $h_{lq}$ above the pipette robot deck (e.g., via operations analogous to the below-discussed deck component height determination operations). Further, the Z-axis height $h_{tb}$ of the bottom of the test tube relative to the deck can be known to the pipette robot (e.g., via operations analogous to the below-discussed deck component height determination operations). The pipette robot can then compute the liquid volume as $V=\pi r^2 (h_{lq}-h_{tb})$, where r is the radius of the test tube as known by the pipette robot (e.g., via the pipette robot accessing a store which holds such radius data). In various embodiments, the result of the calculation can be adjusted to compensate for tapering of the body of the test tube.

Under certain circumstances, such as in the case of a spun-down sample, the liquid held by the test tube can sit above solid material which is situated at the bottom of a test tube. As such, according to various embodiments, in addition to having a sensor emit and detect a given wavelength of light (e.g., between 500 and 850 nm) in order to determine the distance between the surface of the liquid and the sensor, the pipette robot can have the sensor (or a second sensor) emit and detect a different wavelength of light in order to determine the distance between the solid material and the sensor. This different wavelength can be selected so as to allow the emitted light to pass through the liquid portion, reflect off the solid portion, and return through the liquid portion and back to the sensor. The pipette robot can subsequently convert this second distance to a Z-axis height $h_{sd}$ of the solid above the pipette robot deck (e.g., in a manner analogous to that discussed below with respect to deck component height determination). The pipette robot can then compute the liquid volume as $V=\pi r^2 (h_{lq}-h_{sd}-h_{tb})$, In some embodiments, the result of the calculation can be adjusted to compensate for tapering of the body of the test tube.

According to various embodiments, the pipette robot can take into account the meniscus of a liquid when determining the height of the liquid for purposes of pipetting the liquid, or ascertaining the volume of the liquid. In particular, the pipette robot can determine the center of the meniscus, and then establish the height of the liquid as sensed at this location to be the height of the liquid for the just-noted purposes. In this way, the pipette robot can make allowances for surface tension interactions between the liquid and a test tube which holds the liquid.

Figure 13:
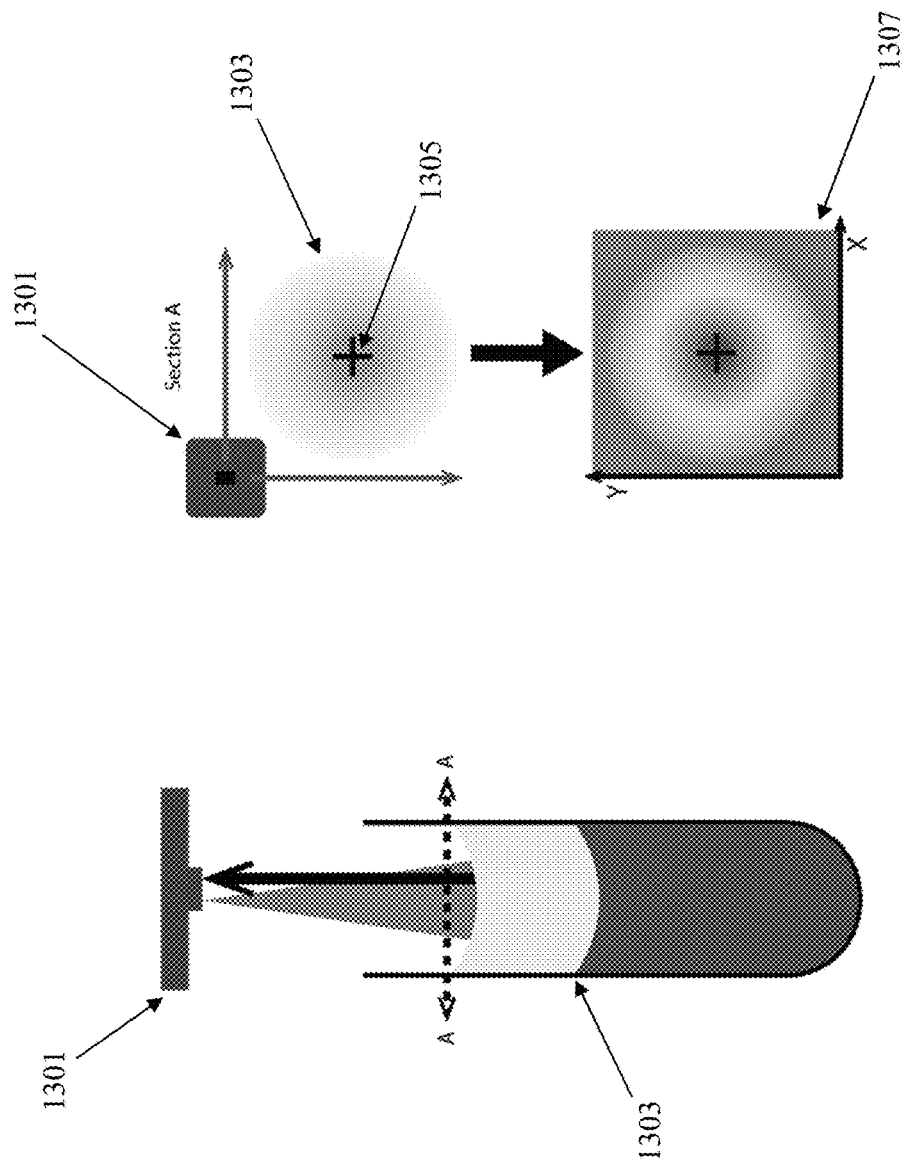
FIG. 13 shows meniscus-oriented functionality, according to various embodiments.

Shown in FIG. 13 are a sensor 1301, a meniscus 1303, a meniscus center 1305, and a heat map 1307. With reference to FIG. 13, in order to ascertain the location of the center of the meniscus, the pipette robot can use a given sensor (e.g., a sensor attached to a pipette head) to scan the surface of the liquid as held by a given test tube. In particular, the pipette robot can move the sensor over the surface in the X and Y directions while having the sensor report distances.

When performing this scanning, the pipette robot can maintain the sensor at an appropriate Z-axis height above the liquid surface (e.g., a height which causes the surface to be within the FOV of the sensor). The reported distances can be used by the pipette robot to generate a heatmap which reflects, for each of multiple X/Y coordinates, the corresponding reported distance.

Subsequently, the pipette robot can use this heatmap to determine the location (e.g., X/Y coordinates) of the center of the meniscus. For example, in the case of a concave meniscus, the pipette robot can consider the center of the meniscus to be at the X/Y coordinate location(s) having the farthest corresponding distance according to the heatmap. As such, the meniscus can, for instance, be located at the global distance maximum according to the heatmap. The pipette robot can subsequently use this distance corresponding to the meniscus center to perform the above-discussed operations, such as instructing a pipette assembly to descend a tip to an appropriate height which allows for pipetting of the liquid while preventing tip contamination by the liquid being pipetted. Where fixed sensors are used, in the case of a multichannel pipette/multiple test tubes there can be a fixed sensor for each test tube, and the noted operations can be performed for each sensor/test tube pair. Where one or more unfixed sensors are used, in the case of a multichannel pipette/multiple test tubes the pipette robot can act in a similar way, but additionally move such an unfixed sensor to become generally aligned with each of more or more of the multiple test tubes. The pipette robot can then perform the noted operations (e.g., liquid surface scanning) with respect to the particular test tube with which the unfixed sensor has become generally aligned. Moreover, the Z-axis height at which the pipette robot maintains a given sensor during liquid surface scanning can be adjusted to achieve variable resolutions of the heatmap as to meniscus height distribution along the surface of the liquid.

Figure 14:
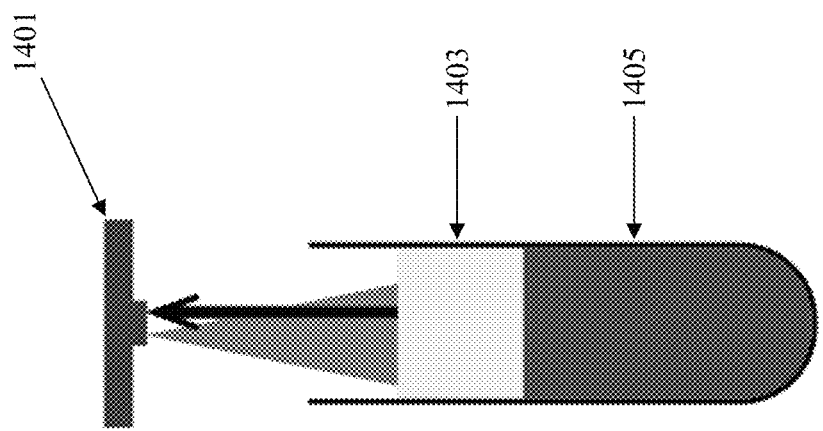
FIG. 14 shows functionality regarding the pipetting of a serum portion of a spun down whole blood sample, according to various embodiments.

As an example, the liquid for which the discussed surface height determination and subsequent pipetting is performed, or for which liquid volume is ascertained, can be the serum of a spun-down whole blood sample. In the spun-down sample, the serum can sit in a given test tube above solid material. This solid material can include white blood cells, red blood cells, and/or platelets. Shown in FIG. 14 are a sensor 1401, serum 1403, and solid material 1405. With reference to FIG. 14, the pipette robot can act as discussed above to use a sensor in proximity to the spun-down sample in determining the distance between the sensor and the surface of serum portion of the spun-down sample. As such, the pipette robot can, for example, cause the sensor to emit a particular wavelength of light (e.g., between 500 and 850 nm), and this light can subsequently reflect off the surface of the serum for detection by the sensor, as discussed. The pipette robot can act as discussed above to use the distance reported by the sensor in instructing a pipette to descend a tip to an appropriate height. This appropriate height can be a height which allows for pipetting of the serum, but which prevents both tip contamination by the serum, and also disturbance by the tip of the solid material which sits towards the bottom of the test tube.

Distance Sensing: Deck Component Height Determination

As another example, the above-noted distance sensing functionality can be utilized by the pipette robot in determining the Z-axis heights of various components which sit upon the pipette robot deck. As examples, these components can include test tubes, test tube racks, well/flat plates, pipette tips, and pipette tip racks, each of which can have a different height.

The pipette robot can take the determined heights of the deck components into account when performing operations which involve traveling pipettes and sensors across the pipette robot deck (e.g., the above-discussed liquid sensing and aspiration depth control operations). In particular, the pipette robot can perform these operations so as to avoid crashing such pipettes and sensors into the deck components. For instance, the pipette robot can travel such pipettes and sensors at Z-axis heights which are high enough that the pipettes and sensors do not collide with deck components, yet are low enough to perform any called for interactions with the deck components (e.g., pipetting a liquid). Alternately or additionally, the pipette robot can travel such pipettes and sensors over an X-axis/Y-axis path which avoids the deck components. By having the pipette robot automatically determine the heights of the various deck components, cumbersome and/or error-prone alternatives— such as manual user input of deck component heights, the pipette robot scanning barcodes to read in the deck component heights, and/or the pipette robot using a camera and image analysis to determine the deck component heights— can be avoided.

Figure 15:
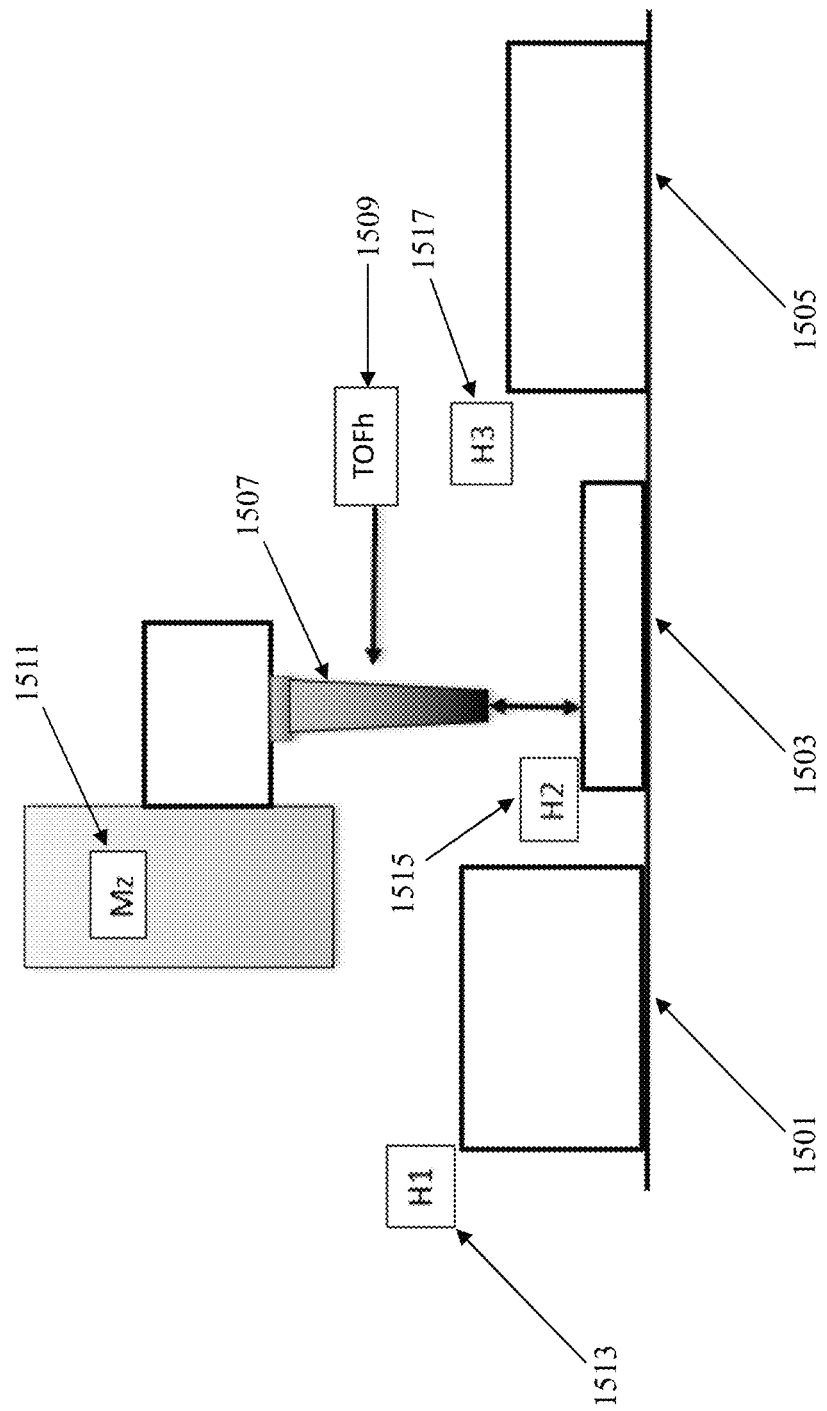
FIG. 15 shows an example of the application of distance sensing to deck component height determination, according to various embodiments.

Shown in FIG. 15 are a test tube rack 1501, a well/flat plate 1503, a pipette tip rack 1505, and a tip 1507 (for which a sensor looks down and through the tip 1507). Also shown in FIG. 15 are a distance $TOF_h$ (1509), a distance $M_z$ (1511), a height $H_1$ (1513), a height $H_2$ (1515), and a height $H_3$ (1517). With reference to FIG. 15, in determining the heights of the various deck components, the pipette robot can travel a sensor (e.g., a sensor attached to a pipette head) over the X-axis/Y-axis area occupied by each component on the deck. When visiting a given deck component with the sensor, the pipette robot can have the sensor report the distance $TOF_h$. Further, the pipette robot can be aware of the distance $M_z$ that the sensor sits above the deck (e.g., via a calibration operation performed by the pipette robot). As such, for each deck component n the pipette robot can determine the height of such component as $H_n = M_z - TOF_h$. In the example of FIG. 15, the pipette robot has acted in this way to determine $H_1$ as the height of the test tube rack, $H_2$ as the height of the well/flat plate, and $H_3$ as the height of the pipette tip rack. It is noted that, according to various embodiments, where the sensor reports multiple distances while over a particular component, $TOF_h$ can be calculated as an average (e.g., mean or modal average) of these distances.

As discussed above, in determining the heights of the various deck components the pipette robot can travel the sensor over the X-axis/Y-axis area occupied by each component. The pipette robot can be aware of these areas in various ways. As one example, the pipette robot can consult a store which holds such information. As another example, the pipette robot can use the sensor to perform an initial scan which serves to map out the X-axis/Y-axis location of each deck component. In particular, the pipette robot can have the sensor report distances during the initial scan, and the pipette robot can consider a contiguous area for which the sensor reports distances shorter than a baseline distance to correspond to components. Such a baseline distance can be the longest distance reported by the sensor during the initial scan, and can correspond to the distance from the sensor to the pipette robot deck.

In connection with determination of deck component heights, the pipette robot can travel the sensor at a particular Z-axis height. Likewise, the pipette robot can travel the sensor at a particular Z-axis height during the initial scan. In selecting this particular Z-axis height the pipette robot can take multiple factors into account. One such factor can be the FOV of the sensor. Another such factor can be the height of the tallest component on the deck as known to the pipette robot (e.g., according to manufacturer specifications). As such, in various embodiments the particular Z-axis height chosen by the pipette robot can be high enough to avoid hitting the tallest component on the deck (e.g., according to manufacture specifications), but not so high as to place the components outside of the FOV of the sensor.

Sensor and Connectivity Information

Figure 16:
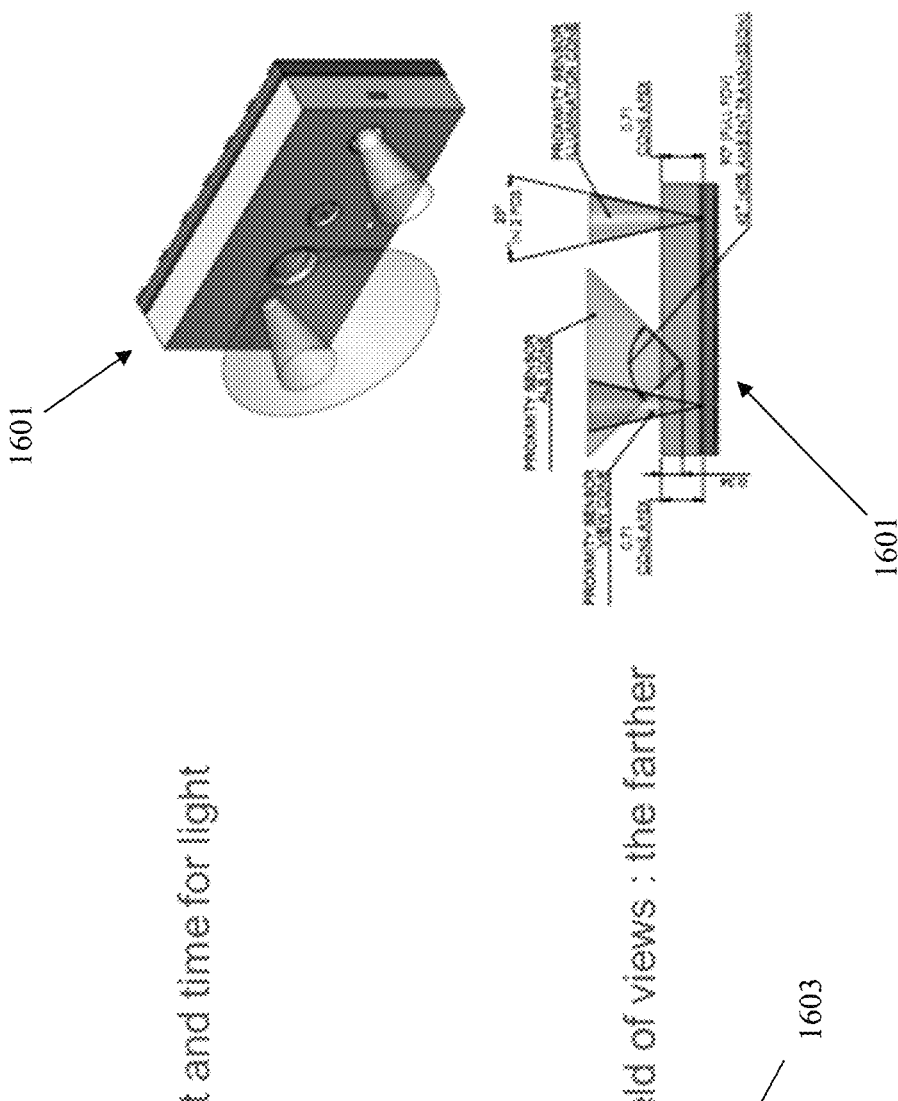
FIG. 16 shows a time-of-flight (TOF) sensor, according to various embodiments.

Shown in FIG. 16 is a TOF sensor 1601 applicable to various embodiments discussed herein. Also shown in FIG. 16 are various technical specifications 1603 of the depicted sensor, including the accuracy and reliability specifications for the sensor. In some embodiments, the sensor of FIG. 16 can be a STMicroelectronics VL6180X. However, a variety of other sensor models can be used in the operations discussed herein (e.g., a STMicroeletronics VL53LOX can be used). The datasheets of the STMicroelectronics VL6180X and VL53LOX TOF sensors are incorporated herein in their entireties. The sensors utilized herein can typically be obtained at a low cost, for instance a cost of on order of $1 (US) per sensor.

Hardware and Software

It is noted that, in various embodiments, the sensors discussed herein can be connected to one or more microcontroller boards such as Arduino microcontroller boards. Further in these embodiments, the microcontroller board(s) can interface (e.g., via USB) with further circuitry of the system, such as one or more Raspberry Pis or other single board computers utilized by the system. Many variations are possible. More generally, according to various embodiments, various functionality discussed herein can be performed by and/or with the help of one or more computers. For example, a pipette robot as discussed herein can incorporate one or more such computers, and/or be connected to such one or more computers via one or more input/output (I/O) interfaces. Such a computer can be and/or incorporate, as just some examples, a personal computer, a server, a smartphone, a system-on-a-chip, and/or a microcontroller. Such a computer can, in various embodiments, run Linux, MacOS, Windows, or another operating system.

Figure 17:
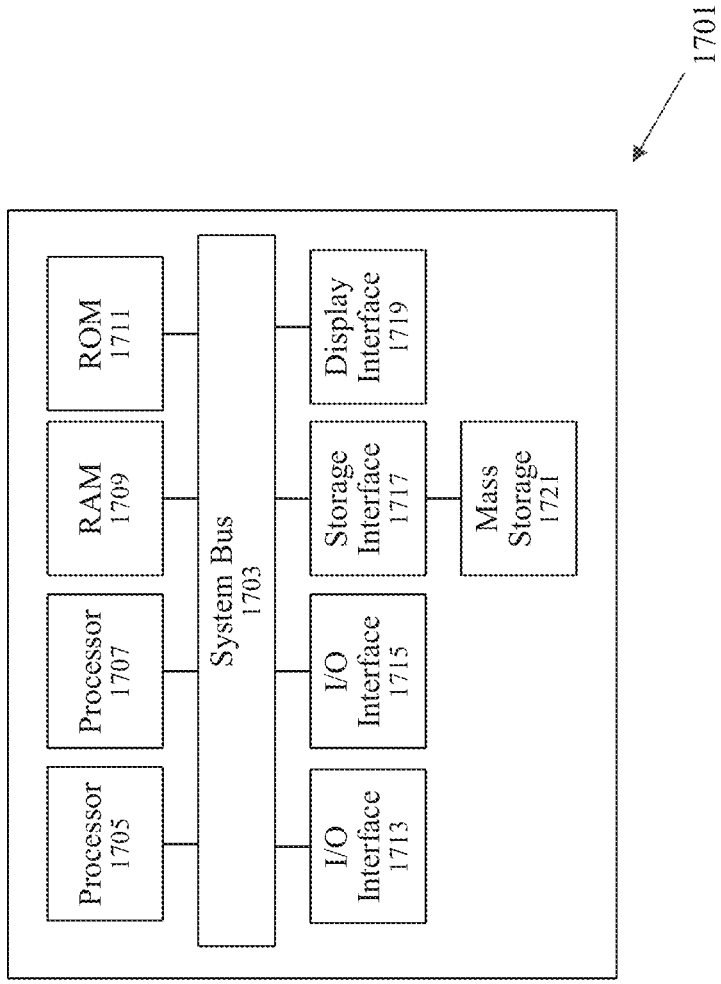
FIG. 17 shows an example computer, according to various embodiments.

Such a computer can also be and/or incorporate one or more processors operatively connected to one or more memory or storage units, wherein the memory or storage may contain data, algorithms, and/or program code, and the processor or processors may execute the program code and/or manipulate the program code, data, and/or algorithms. Shown in FIG. 17 is an example computer employable in various embodiments of the present invention. Exemplary computer 1701 includes system bus 1703 which operatively connects two processors 1705 and 1707, random access memory (RAM) 1709, read-only memory (ROM) 1711, input output (I/O) interfaces 1713 and 1715, storage interface 1717, and display interface 1719. Storage interface 1717 in turn connects to mass storage 1721. One or more of I/O interfaces 1713 and 1715 can, in various embodiments, connect to various pipette robot hardware, such as one or more motors, motor controllers, and/or sensors. Each of I/O interfaces 1713 and 1715 can, as just some examples, be a Universal Serial Bus (USB), a Thunderbolt, an Ethernet, a Bluetooth, a Long Term Evolution (LTE), an IEEE 488 and/or other interface. Mass storage 1721 can be a flash drive, a hard drive, an optical drive, or a memory chip, as just some possibilities. Processors 1705 and 1707 can each be, as just some examples, a commonly known processor such as an ARM-based or x86-based processor. Computer 1701 can, in various embodiments, include or be connected to a touch screen, a mouse, and/or a keyboard. Computer 1701 can additionally include or be attached to card readers, DVD drives, floppy disk drives, hard drives, memory cards, ROM, and/or the like whereby media containing program code (e.g., for performing various operations and/or the like described herein) may be inserted for the purpose of loading the code onto the computer.

In accordance with various embodiments of the present invention, a computer may run one or more software modules designed to perform one or more of the above-described operations. Such modules might, for example, be programmed using Python, Java, Swift, C, C++, C#, and/or another language. Corresponding program code might be placed on media such as, for example, DVD, CD-ROM, memory card, and/or floppy disk. It is noted that any indicated division of operations among particular software modules is for purposes of illustration, and that alternate divisions of operation may be employed. Accordingly, any operations indicated as being performed by one software module might instead be performed by a plurality of software modules. Similarly, any operations indicated as being performed by a plurality of modules might instead be performed by a single module. It is noted that operations indicated as being performed by a particular computer might instead be performed by a plurality of computers. It is further noted that, in various embodiments, peer-to-peer and/or grid computing techniques may be employed. It is additionally noted that, in various embodiments, remote communication among software modules may occur. Such remote communication might, for example, involve JavaScript Object Notation-Remote Procedure Call (JSON-RPC), Simple Object Access Protocol (SOAP), Java Messaging Service (JMS), Remote Method Invocation (RMI), Remote Procedure Call (RPC), sockets, and/or pipes.

Moreover, in various embodiments the functionality discussed herein can be implemented using special-purpose circuitry, such as via one or more integrated circuits, Application Specific Integrated Circuits (ASICs), or Field Programmable Gate Arrays (FPGAs). A Hardware Description Language (HDL) can, in various embodiments, be employed in instantiating the functionality discussed herein. Such an HDL can, as just some examples, be Verilog or Very High Speed Integrated Circuit Hardware Description Language (VHDL). More generally, various embodiments can be implemented using hardwired circuitry without or without software instructions. As such, the functionality discussed herein is limited neither to any specific combination of hardware circuitry and software, nor to any particular source for the instructions executed by the data processing system.

Ramifications and Scope

Although the description above contains many specifics, these are merely provided to illustrate the invention and should not be construed as limitations of the invention's scope. Thus, it will be apparent to those skilled in the art that various modifications and variations can be made in the system and processes of the present invention without departing from the spirit or scope of the invention.

In addition, the embodiments, features, methods, systems, and details of the invention that are described above in the application may be combined separately or in any combination to create or describe new embodiments of the invention.

The invention claimed is:

1. A pipette robot, comprising:
   at least one processor;
   a memory;
   a pipette; and
   at least one time-of-flight sensor integrated module, wherein said at least one integrated module comprises a detector and an emitter on a single device,
   wherein the memory stores instructions that, when executed by the at least one processor, cause the pipette robot to perform:
   aligning at least one tip of the pipette with at least one vessel;
   descending the at least one tip to a first Z-axis height, wherein said descending to the first Z-axis height causes a surface of a liquid held by the at least one vessel to be within a field of view of the at least one sensor;
   instructing the at least one sensor to emit light having a first wavelength;
   instructing the at least one sensor to emit light having a second wavelength, wherein the light having the second wavelength passes through a liquid portion held by the at least one vessel and reflects off a solid portion held by the at least one vessel;
   querying the at least one time-of-flight sensor for at least one sensor value;
   selecting, utilizing the at least one sensor value, a second Z-axis height; and
   descending the at least one tip to the second Z-axis height.

2. The pipette robot of claim 1, wherein said selected second Z-axis height allows for pipetting of said liquid held by the at least one vessel while preventing contamination of the at least one tip by said liquid.

3. The pipette robot of claim 1, wherein the pipette is a multichannel pipette, the at least one sensor is a single sensor, and wherein the instructions, when executed by the at least one processor, further cause the pipette robot to perform:
   moving the single sensor to each of multiple positions corresponding to channels of the multichannel pipette.

4. A pipette robot, comprising:
   at least one processor;
   a memory;
   a pipette; and
   at least one time-of-flight sensor integrated module, wherein said at least one integrated module comprises a detector and an emitter on a single device,
   wherein the memory stores instructions that, when executed by the at least one processor, cause the pipette robot to perform:
   aligning at least one tip of the pipette with at least one vessel;
   descending the at least one tip to a first Z-axis height, wherein said descending to the first Z-axis height causes a surface of a liquid held by the at least one vessel to be within a field of view of the at least one sensor;
   querying the at least one time-of-flight sensor for at least one sensor value;
   scanning, utilizing the at least one time-of-flight sensor, a surface of said liquid;
   compiling, for each of multiple X/Y coordinate locations visited by the at least one time-of-flight sensor, a sensor value;
   determining, utilizing said compiled sensor values, a center of a meniscus of said liquid;
   selecting, utilizing the at least one sensor value, a second Z-axis height; and
   descending the at least one tip to the second Z-axis height, wherein the determined center of the meniscus is utilized in said selection of the second Z-axis height.

5. The pipette robot of claim 4, wherein said selected second Z-axis height allows for pipetting of said liquid held by the at least one vessel while preventing contamination of the at least one tip by said liquid.

6. The pipette robot of claim 4, wherein the pipette is a multichannel pipette, the at least one sensor is a single sensor, and wherein the instructions, when executed by the at least one processor, further cause the pipette robot to perform:
    moving the single sensor to each of multiple positions corresponding to channels of the multichannel pipette.

7. A pipette robot, comprising:
    at least one processor;
    a memory;
    a pipette; and
    at least one time-of-flight sensor integrated module, wherein said at least one integrated module comprises a detector and an emitter on a single device,
    wherein the memory stores instructions that, when executed by the at least one processor, cause the pipette robot to perform:
    aligning at least one tip of the pipette with at least one vessel;
    descending the at least one tip to a first Z-axis height, wherein said descending to the first Z-axis height causes a surface of a liquid held by the at least one vessel to be within a field of view of the at least one sensor;
    querying the at least one time-of-flight sensor for at least one sensor value;
    scanning, utilizing the at least one time-of-flight sensor, a surface of said liquid;
    compiling, for each of multiple X/Y coordinate locations visited by the at least one time-of-flight sensor, a sensor value;
    selecting, utilizing the at least one sensor value, a second Z-axis height; and
    descending the at least one tip to the second Z-axis height, wherein the compilation of said sensor values comprises generating a distance heatmap.

8. The pipette robot of claim 7, wherein said selected second Z-axis height allows for pipetting of said liquid held by the at least one vessel while preventing contamination of the at least one tip by said liquid.

9. The pipette robot of claim 7, wherein the pipette is a multichannel pipette, the at least one sensor is a single sensor, and wherein the instructions, when executed by the at least one processor, further cause the pipette robot to perform:
    moving the single sensor to each of multiple positions corresponding to channels of the multichannel pipette.

* * * * *